(12) United States Patent
Wheatley et al.

(10) Patent No.: US 11,676,401 B2
(45) Date of Patent: Jun. 13, 2023

(54) MULTI-DISTANCE INFORMATION PROCESSING USING RETROREFLECTED LIGHT PROPERTIES

(71) Applicant: 3M INNOVATIVE PROPERTIES COMPANY, St. Paul, MN (US)

(72) Inventors: John A. Wheatley, Stillwater, MN (US); Susannah C. Clear, Hastings, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

(21) Appl. No.: 17/261,764

(22) PCT Filed: Sep. 30, 2019

(86) PCT No.: PCT/IB2019/058304
§ 371 (c)(1),
(2) Date: Jan. 20, 2021

(87) PCT Pub. No.: WO2020/070627
PCT Pub. Date: Apr. 9, 2020

(65) Prior Publication Data
US 2021/0279489 A1 Sep. 9, 2021

Related U.S. Application Data

(60) Provisional application No. 62/741,349, filed on Oct. 4, 2018.

(51) Int. Cl.
*G06V 20/00* (2022.01)
*G06V 20/58* (2022.01)
(Continued)

(52) U.S. Cl.
CPC ......... *G06V 20/582* (2022.01); *G05D 1/0234* (2013.01); *G05D 1/0246* (2013.01);
(Continued)

(58) Field of Classification Search
CPC ............ G06K 9/00818; G06K 9/2036; G05D 1/0234; G05D 1/0246
See application file for complete search history.

(56) References Cited

U.S. PATENT DOCUMENTS

| 4,581,325 A | 4/1986 | Kitchin |
| 6,677,030 B2 | 1/2004 | Thakkar |

(Continued)

FOREIGN PATENT DOCUMENTS

| EP | 0416742 | 3/1991 |
| WO | WO 2011-129832 | 10/2011 |

(Continued)

OTHER PUBLICATIONS

International Search report for PCT International Application No. PCT/IB2019/058304 dated Jan. 2, 2020, 4 pages.

*Primary Examiner* — Md K Talukder
(74) *Attorney, Agent, or Firm* — Jonathan L. Tolstedt

(57) ABSTRACT

In some examples, a method may include receiving retroreflected light that indicates at least one retroreflective property of a retroreflective article, wherein retroreflected light is captured at a first distance. The method may include determining a first set of information based at least in part on the at least one retroreflective property of the retroreflective article. The method may include receiving, from the light capture device, an image that includes at least one object, wherein the image is captured at a second distance. The method may include determining, based at least in part on the spatially resolvable property, a second set of information that corresponds to the object in the image. The method may include performing, by a computing device, at least one operation based at least in part on the second set of information.

17 Claims, 17 Drawing Sheets

(51) Int. Cl.
   *G05D 1/02*    (2020.01)
   *G06V 10/145*  (2022.01)
   *G06V 10/143*  (2022.01)

(52) U.S. Cl.
   CPC .......... *G06V 10/143* (2022.01); *G06V 10/145* (2022.01); *G05D 2201/0213* (2013.01)

(56) References Cited

U.S. PATENT DOCUMENTS

| | | |
|---|---|---|
| 7,068,434 B2 | 6/2006 | Florczak |
| 7,068,464 B2 | 6/2006 | Dee |
| 7,387,393 B2 | 6/2008 | Reich |
| 7,422,334 B2 | 9/2008 | Smith |
| 7,611,251 B2 | 11/2009 | Thakkar |
| 8,865,293 B2 | 10/2014 | Smithson |
| 8,950,877 B2 | 2/2015 | Northey |
| 2006/0001888 A1* | 1/2006 | Hill .................. G02B 5/122 356/493 |
| 2006/0262312 A1* | 11/2006 | Retterath ......... G08G 1/096716 356/445 |
| 2012/0240485 A1 | 9/2012 | Amarasinghe |
| 2013/0034682 A1 | 2/2013 | Free |
| 2013/0114142 A1 | 5/2013 | Free |
| 2013/0114143 A1 | 5/2013 | Thakkar |
| 2013/0271613 A1* | 10/2013 | Retterath ................ G01S 17/06 348/169 |
| 2014/0078587 A1 | 3/2014 | Orensteen |
| 2014/0368902 A1 | 12/2014 | Patel |
| 2015/0043074 A1 | 2/2015 | Patel |
| 2015/0317923 A1* | 11/2015 | Edmonds .................. G09F 3/10 235/494 |
| 2017/0372607 A1* | 12/2017 | Janovec .................. G06V 10/22 |
| 2019/0220717 A1* | 7/2019 | Shannon ............. G06K 19/0614 |
| 2020/0034590 A1* | 1/2020 | Howard ............... G06K 7/1413 |
| 2020/0292735 A1* | 9/2020 | Hadi ...................... G02B 5/124 |
| 2021/0039669 A1* | 2/2021 | Watson ................ G06V 20/588 |
| 2021/0264186 A1* | 8/2021 | Wheatley ........... B60W 60/001 |
| 2021/0279489 A1* | 9/2021 | Wheatley ............. G06V 10/145 |

FOREIGN PATENT DOCUMENTS

| | | |
|---|---|---|
| WO | WO 2013-149142 | 10/2013 |
| WO | WO 2015-148426 | 10/2015 |
| WO | WO 2017-151202 | 9/2017 |
| WO | WO 2018-064198 | 4/2018 |
| WO | WO 2018-064203 | 4/2018 |
| WO | WO 2018-064212 | 4/2018 |
| WO | WO 2018-151761 | 8/2018 |
| WO | WO 2020-070584 | 4/2020 |

* cited by examiner

| Emitter | | | Retroreflected Light | | | | | | | | | | | |
|---|---|---|---|---|---|---|---|---|---|---|---|---|---|---|
| | | | λ1 | | | | | | λ2 | | | | | |
| | | | L | XL | LC | RC | DP | Abs | L | XL | LC | RC | DP | Abs |
| One wavelength emission | λ1 | L | 1 | 2 | 3 | 4 | 5 | 6 | | | | | | |
| | | LC | 7 | 8 | 9 | 10 | 11 | 12 | | | | | | |
| | | RC | 13 | 14 | 15 | 16 | 17 | 19 | | | | | | |
| Two wavelength emission | λ1 | L | 20 | 21 | 22 | 23 | 24 | 25 | 26 | 27 | 28 | 29 | 30 | 31 |
| | | LC | 32 | 33 | 34 | 35 | 36 | 37 | 38 | 39 | 40 | 41 | 42 | 43 |
| | | RC | 44 | 45 | 46 | 47 | 48 | 49 | 50 | 51 | 52 | 53 | 54 | 55 |
| | λ2 | | 56 | 57 | 58 | 59 | 60 | 61 | 62 | 63 | 64 | 65 | 66 | 67 |
| | | LC | 68 | 69 | 70 | 71 | 72 | 73 | 74 | 75 | 76 | 77 | 78 | 79 |
| | | | 80 | 81 | 82 | 83 | 84 | 85 | 86 | 87 | 88 | 89 | 90 | 91 |

*FIG. 5*

MULTI-DISTANCE INFORMATION PROCESSING USING RETROREFLECTED LIGHT PROPERTIES

TECHNICAL FIELD

The present application relates generally to pathway articles and systems in which such pathway articles may be used.

BACKGROUND

Current and next generation vehicles may include those with a fully automated guidance systems, semi-automated guidance and fully manual vehicles. Semi-automated vehicles may include those with advanced driver assistance systems (ADAS) that may be designed to assist drivers avoid accidents. Automated and semi-automated vehicles may include adaptive features that may automate lighting, provide adaptive cruise control, automate braking, incorporate GPS/traffic warnings, connect to smartphones, alert driver to other cars or dangers, keep the driver in the correct lane, show what is in blind spots and other features. Infrastructure may increasingly become more intelligent by including systems to help vehicles move more safely and efficiently such as installing sensors, communication devices and other systems. Over the next several decades, vehicles of all types, manual, semi-automated and automated, may operate on the same roads and may need operate cooperatively and synchronously for safety and efficiency.

SUMMARY

In general, techniques and articles of this disclosure are directed to hyperspectral optical patterns that may include one or more optical sub-patterns that are visible at different distances. In some examples, a computing device may determine information from one or more retroreflective properties of light received at a light capture device. Examples of retroreflective properties as described in this disclosure may include light polarization direction or wavelength, although many other examples are described and within the spirit and scope of this disclosure. Because the retroreflective properties of light returned from the retroreflective article may be detected at distances greater than a distance at which an optical pattern may be resolved, techniques and articles of this disclosure may determine a first set of information based on retroreflective properties of light returned from a retroreflective article at a distance between the light capture device and computing device that is greater than a distance at which information for an optical pattern can be interpreted or decoded. Accordingly, at distances further away, retroreflective properties of light returned from a retroreflective article may be used to determine the first set of information, and as the distance between the image or light capture device and the retroreflective article decreases, the optical pattern may be decoded or interpreted to obtain a second set of information. Although an optical pattern has been described, any spatial property of an object that is resolvable may be used to determine the second set of information. Such hyperspectral optical patterns may provide one or more advantages over conventional techniques. For example, hyperspectral optical patterns may be used for conveying more important information from further distances via retroflective properties of the hyperspectral optical pattern, while conveying less important information for closer distances via an optical pattern of the hyperspectral optical pattern. In some examples, determining more important information from further distances away while determining less important information at closer distances may be beneficial for vehicle safety.

In some examples, method may include receiving, from a light capture device, retroreflected light that indicates at least one retroreflective property of a retroreflective article, wherein retroreflected light is captured at a first distance between the light capture device and the retroreflective article; determining, by a computing device communicatively coupled to the light capture device, a first set of information based at least in part on the at least one retroreflective property of the retroreflective article; receiving, by the computing device and from the light capture device, an image that includes at least one object, wherein the image is captured at a second distance between the light capture device and the retroreflective article that is less than the first distance, wherein the at least one object in the image includes a spatially resolvable property that is not resolvable at the first distance; determining, by the computing device and based at least in part on the spatially resolvable property, a second set of information that corresponds to the object in the image; and performing, by the computing device, at least one operation based at least in part on the second set of information.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5 illustrates an example optical signature language or encoding between retroreflective properties and values.

DETAILED DESCRIPTION

Figure 1:
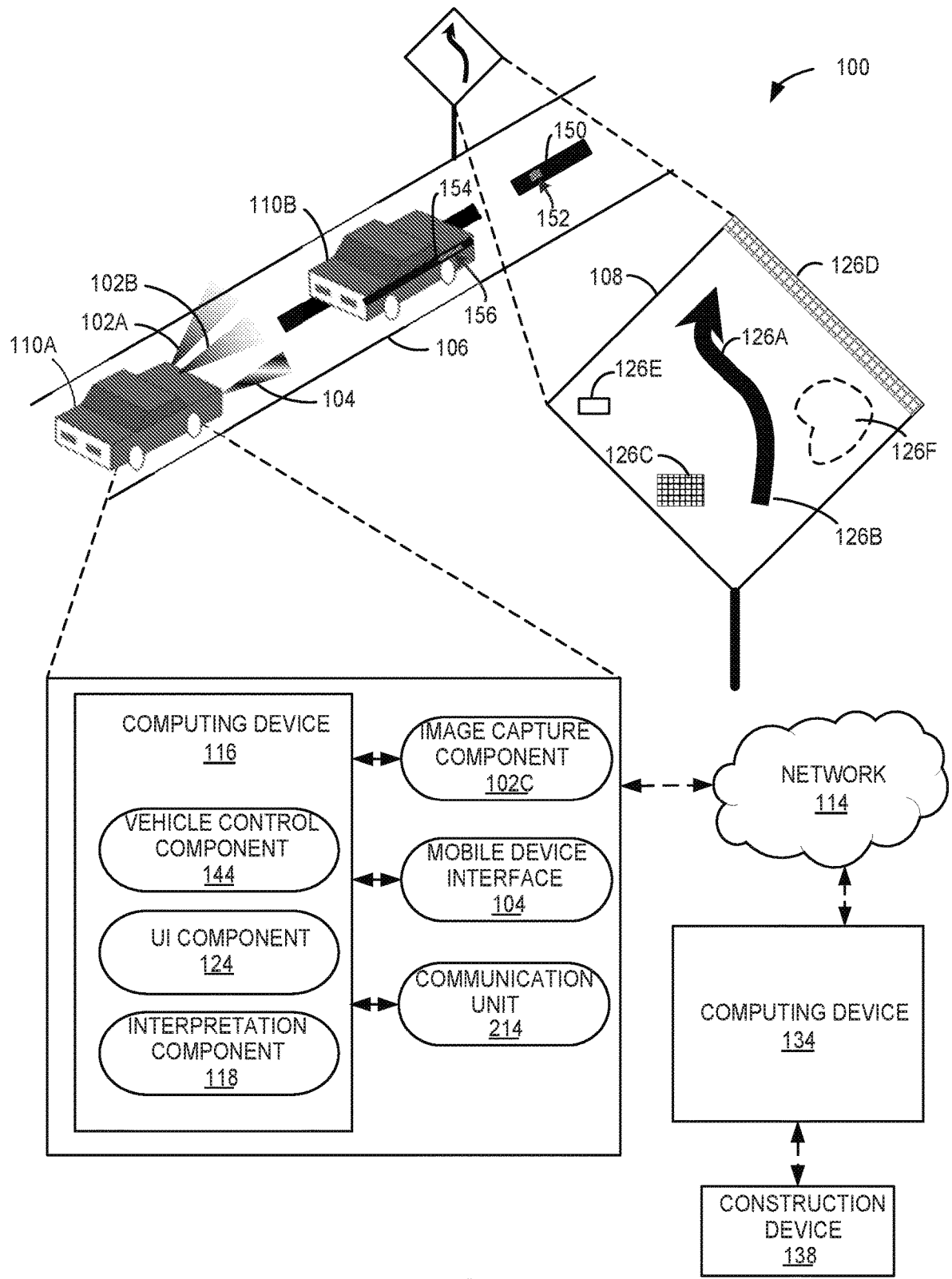
FIG. 1 is a block diagram illustrating an example system with an enhanced sign that is configured to be interpreted by a PAAV in accordance with techniques of this disclosure.

Even with advances in autonomous driving technology, infrastructure, including vehicle roadways, may have a long transition period during which fully PAAVs, vehicles with advanced Automated Driver Assist Systems (ADAS), and traditional fully human operated vehicles share the road. Some practical constraints may make this transition period decades long, such as the service life of vehicles currently on the road, the capital invested in current infrastructure and the cost of replacement, and the time to manufacture, distribute, and install fully autonomous vehicles and infrastructure.

Autonomous vehicles and ADAS, which may be referred to as semi-autonomous vehicles, may use various sensors to perceive the environment, infrastructure, and other objects around the vehicle. These various sensors combined with onboard computer processing may allow the automated system to perceive complex information and respond to it more quickly than a human driver. In this disclosure, a vehicle may include any vehicle with or without sensors, such as a vision system, to interpret a vehicle pathway. A vehicle with vision systems or other sensors that takes cues from the vehicle pathway may be called a pathway-article assisted vehicle (PAAV). Some examples of PAAVs may include the fully autonomous vehicles and ADAS equipped vehicles mentioned above, as well as unmanned aerial vehicles (UAV) (aka drones), human flight transport devices, underground pit mining ore carrying vehicles, forklifts, factory part or tool transport vehicles, ships and other watercraft and similar vehicles. Various actions taken by vehicles could include performing operations, navigation, communication, or computational actions. A vehicle pathway may be a road, highway, a warehouse aisle, factory floor or a pathway not connected to the earth's surface. The vehicle pathway may include portions not limited to the pathway itself. In the example of a road, the pathway may include the road shoulder, physical structures near the pathway such as toll booths, railroad crossing equipment, traffic lights, the sides of a mountain, guardrails, and generally encompassing any other properties or characteristics of the pathway or objects/structures in proximity to the pathway. This will be described in more detail below.

A pathway article, such as an enhanced sign, in accordance with the techniques of this disclosure may include an article message on the physical surface of the pathway article. In this disclosure, an article message may include images, graphics, characters, such as numbers or letters or any combination of characters, symbols or non-characters. An article message may include human-perceptible information and machine-perceptible information. Human-perceptible information may include information that indicates one or more first characteristics of a vehicle pathway primary information, such as information typically intended to be interpreted by human drivers. In other words, the human-perceptible information may provide a human-perceptible representation that is descriptive of at least a portion of the vehicle pathway. As described herein, human-perceptible information may generally refer to information that indicates a general characteristic of a vehicle pathway and that is intended to be interpreted by a human driver. For example, the human-perceptible information may include words (e.g., "dead end" or the like), symbols or graphics (e.g., an arrow indicating the road ahead includes a sharp turn). Human-perceptible information may include the color of the article message or other features of the pathway article, such as the border or background color. For example, some background colors may indicate information only, such as "scenic overlook" while other colors may indicate a potential hazard.

In some instances, the human-perceptible information may correspond to words or graphics included in a specification. For example, in the United States (U.S.), the human-perceptible information may correspond to words or symbols included in the Manual on Uniform Traffic Control Devices (MUTCD), which is published by the U.S. Department of Transportation (DOT) and includes specifications for many conventional signs for roadways. Other countries have similar specifications for traffic control symbols and devices. In some examples, the human-perceptible information may be referred to as primary information.

According to aspects of this disclosure, an enhanced sign may also include second, additional information that may be interpreted by a PAAV. As described herein, second information or machine-perceptible information may generally refer to additional detailed characteristics of the vehicle pathway. The machine-perceptible information is configured to be interpreted by a PAAV, but in some examples, may be interpreted by a human driver. In other words, machine-perceptible information may include a feature of the graphical symbol that is a computer-interpretable visual property of the graphical symbol. In some examples, the machine-perceptible information may relate to the human-perceptible information, e.g., provide additional context for the human-perceptible information. In an example of an arrow indicating a sharp turn, the human-perceptible information may be a general representation of an arrow, while the machine-perceptible information may provide an indication of the particular shape of the turn including the turn radius, any incline of the roadway, a distance from the sign to the turn, or the like. The additional information may be visible to a human operator; however, the additional information may not be readily interpretable by the human operator, particularly at speed. In other examples, the additional information may not be visible to a human operator, but may still be machine readable and visible to a vision system of a PAAV. In some examples, an enhanced sign may be considered an optically active article.

A successful implementation of infrastructure and infrastructure support, such as the pathway articles of this disclosure may include redundant sources of information to verify inputs and ensure the vehicles make the appropriate response. The techniques of this disclosure may provide pathway articles with an advantage for intelligent infrastructures, because such articles may provide information that can be interpreted by both machines and humans. This may allow verification that both autonomous systems and human drivers are receiving the same message.

Redundancy and security may be of concern for a partially and fully autonomous vehicle infrastructure. A blank highway approach to an autonomous infrastructure, i.e. one in which there is no signage or markings on the road and all vehicles are controlled by information from the cloud, may be susceptible to hackers, terroristic ill intent, and unintentional human error. For example, GPS signals can be spoofed to interfere with drone and aircraft navigation. The techniques of this disclosure provide local, onboard redundant validation of information received from GPS and the cloud. The pathway articles of this disclosure may provide additional information to autonomous systems in a manner which is at least partially perceptible by human drivers. Therefore, the techniques of this disclosure may provide solutions that may support the long-term transition to a fully autonomous infrastructure because it can be implemented in high impact areas first and expanded to other areas as budgets and technology allow.

Hence, pathway articles of this disclosure, such as an enhanced sign, may provide additional information that may be processed by the onboard computing systems of the vehicle, along with information from the other sensors on the vehicle that are interpreting the vehicle pathway. The pathway articles of this disclosure may also have advantages in applications such as for vehicles operating in warehouses, factories, airports, airways, waterways, underground or pit mines and similar locations.

FIG. 1 is a block diagram illustrating an example system 100 with an enhanced sign that is configured to be interpreted by a PAAV in accordance with techniques of this disclosure. As described herein, PAAV generally refers to a vehicle with a vision system, along with other sensors, that may interpret the vehicle pathway and the vehicle's environment, such as other vehicles or objects. A PAAV may interpret information from the vision system and other sensors, make decisions and take actions to navigate the vehicle pathway.

As shown in FIG. 1, system 100 includes PAAV 110A that may operate on vehicle pathway 106 and that includes image capture devices 102A and 102B and computing device 116. Any number of image capture devices may be possible. The illustrated example of system 100 also includes one or more pathway articles as described in this disclosure, such as enhanced sign 108.

As noted above, PAAV 110A of system 100 may be an autonomous or semi-autonomous vehicle, such as an ADAS. In some examples PAAV 110A may include occupants that may take full or partial control of PAAV 110A. PAAV 110A may be any type of vehicle designed to carry passengers or freight including small electric powered vehicles, large trucks or lorries with trailers, vehicles designed to carry crushed ore within an underground mine, or similar types of vehicles. PAAV 110A may include lighting, such as headlights in the visible light spectrum as well as light sources in other spectra, such as infrared. PAAV 110A may include other sensors such as radar, sonar, lidar, GPS and communication links for the purpose of sensing the vehicle pathway, other vehicles in the vicinity, environmental conditions around the vehicle and communicating with infrastructure. For example, a rain sensor may operate the vehicles windshield wipers automatically in response to the amount of precipitation, and may also provide inputs to the onboard computing device 116.

As shown in FIG. 1, PAAV 110A of system 100 may include image capture devices 102A and 102B, collectively referred to as image capture devices 102. Image capture devices 102 may convert light or electromagnetic radiation sensed by one or more image capture sensors into information, such as digital image or bitmap comprising a set of pixels. Each pixel may have chrominance and/or luminance components that represent the intensity and/or color of light or electromagnetic radiation. In general, image capture devices 102 may be used to gather information about a pathway. Image capture devices 102 may send image capture information to computing device 116 via image capture component 102C. Image capture devices 102 may capture lane markings, centerline markings, edge of roadway or shoulder markings, as well as the general shape of the vehicle pathway. The general shape of a vehicle pathway may include turns, curves, incline, decline, widening, narrowing or other characteristics. Image capture devices 102 may have a fixed field of view or may have an adjustable field of view. An image capture device with an adjustable field of view may be configured to pan left and right, up and down relative to PAAV 110A as well as be able to widen or narrow focus. In some examples, image capture devices 102 may include a first lens and a second lens.

Image capture devices 102 may include one or more image capture sensors and one or more light sources. In some examples, image capture devices 102 may include image capture sensors and light sources in a single integrated device. In other examples, image capture sensors or light sources may be separate from or otherwise not integrated in image capture devices 102. As described above, PAAV 110A may include light sources separate from image capture devices 102. Examples of image capture sensors within image capture devices 102 may include semiconductor charge-coupled devices (CCD) or active pixel sensors in complementary metal-oxide-semiconductor (CMOS) or N-type metal-oxide-semiconductor (NMOS, Live MOS) technologies. Digital sensors include flat panel detectors. In one example, image capture devices 102 includes at least two different sensors for detecting light in two different wavelength spectra.

In some examples, one or more light sources 104 include a first source of radiation and a second source of radiation. In some embodiments, the first source of radiation emits radiation in the visible spectrum, and the second source of radiation emits radiation in the near infrared spectrum. In other embodiments, the first source of radiation and the second source of radiation emit radiation in the near infrared spectrum. As shown in FIG. 1 one or more light sources 104 may emit radiation in the near infrared spectrum.

In some examples, image capture devices 102 captures frames at 50 frames per second (fps). Other examples of frame capture rates include 60, 30 and 25 fps. It should be apparent to a skilled artisan that frame capture rates are dependent on application and different rates may be used, such as, for example, 100 or 200 fps. Factors that affect required frame rate are, for example, size of the field of view (e.g., lower frame rates can be used for larger fields of view, but may limit depth of focus), and vehicle speed (higher speed may require a higher frame rate).

In some examples, image capture devices 102 may include at least more than one channel. The channels may be optical channels. The two optical channels may pass through one lens onto a single sensor. In some examples, image capture devices 102 includes at least one sensor, one lens and one band pass filter per channel. The band pass filter permits the transmission of multiple near infrared wavelengths to be received by the single sensor. The at least two channels may be differentiated by one of the following: (a) width of band (e.g., narrowband or wideband, wherein narrowband illumination may be any wavelength from the visible into the near infrared); (b) different wavelengths (e.g., narrowband processing at different wavelengths can be used to enhance features of interest, such as, for example, an enhanced sign of this disclosure, while suppressing other features (e.g., other objects, sunlight, headlights); (c) wavelength region (e.g., broadband light in the visible spectrum and used with either color or monochrome sensors); (d)

sensor type or characteristics; (e) time exposure; and (f) optical components (e.g., lensing).

In some examples, image capture devices 102A and 102B may include an adjustable focus function. For example, image capture device 102B may have a wide field of focus that captures images along the length of vehicle pathway 106, as shown in the example of FIG. 1. Computing device 116 may control image capture device 102A to shift to one side or the other of vehicle pathway 106 and narrow focus to capture the image of enhanced sign 108, or other features along vehicle pathway 106. The adjustable focus may be physical, such as adjusting a lens focus, or may be digital, similar to the facial focus function found on desktop conferencing cameras. In the example of FIG. 1, image capture devices 102 may be communicatively coupled to computing device 116 via image capture component 102C. Image capture component 102C may receive image information from the plurality of image capture devices, such as image capture devices 102, perform image processing, such as filtering, amplification and the like, and send image information to computing device 116.

Other components of PAAV 110A that may communicate with computing device 116 may include image capture component 102C, described above, mobile device interface 104, and communication unit 214. In some examples image capture component 102C, mobile device interface 104, and communication unit 214 may be separate from computing device 116 and in other examples may be a component of computing device 116.

Mobile device interface 104 may include a wired or wireless connection to a smartphone, tablet computer, laptop computer or similar device. In some examples, computing device 116 may communicate via mobile device interface 104 for a variety of purposes such as receiving traffic information, address of a desired destination or other purposes. In some examples computing device 116 may communicate to external networks 114, e.g. the cloud, via mobile device interface 104. In other examples, computing device 116 may communicate via communication units 214.

One or more communication units 214 of computing device 116 may communicate with external devices by transmitting and/or receiving data. For example, computing device 116 may use communication units 214 to transmit and/or receive radio signals on a radio network such as a cellular radio network or other networks, such as networks 114. In some examples communication units 214 may transmit and receive messages and information to other vehicles, such as information interpreted from enhanced sign 108. In some examples, communication units 214 may transmit and/or receive satellite signals on a satellite network such as a Global Positioning System (GPS) network.

In the example of FIG. 1, computing device 116 includes vehicle control component 144 and user interface (UI) component 124 and an interpretation component 118. Components 118, 144, and 124 may perform operations described herein using software, hardware, firmware, or a mixture of both hardware, software, and firmware residing in and executing on computing device 116 and/or at one or more other remote computing devices. In some examples, components 118, 144 and 124 may be implemented as hardware, software, and/or a combination of hardware and software.

Computing device 116 may execute components 118, 124, 144 with one or more processors. Computing device 116 may execute any of components 118, 124, 144 as or within a virtual machine executing on underlying hardware. Components 118, 124, 144 may be implemented in various ways. For example, any of components 118, 124, 144 may be implemented as a downloadable or pre-installed application or "app." In another example, any of components 118, 124, 144 may be implemented as part of an operating system of computing device 116. Computing device 116 may include inputs from sensors not shown in FIG. 1 such as engine temperature sensor, speed sensor, tire pressure sensor, air temperature sensors, an inclinometer, accelerometers, light sensor, and similar sensing components.

UI component 124 may include any hardware or software for communicating with a user of PAAV 110A. In some examples, UI component 124 includes outputs to a user such as displays, such as a display screen, indicator or other lights, audio devices to generate notifications or other audible functions. UI component 24 may also include inputs such as knobs, switches, keyboards, touch screens or similar types of input devices.

Vehicle control component 144 may include for example, any circuitry or other hardware, or software that may adjust one or more functions of the vehicle. Some examples include adjustments to change a speed of the vehicle, change the status of a headlight, changing a damping coefficient of a suspension system of the vehicle, apply a force to a steering system of the vehicle or change the interpretation of one or more inputs from other sensors. For example, an IR capture device may determine an object near the vehicle pathway has body heat and change the interpretation of a visible spectrum image capture device from the object being a non-mobile structure to a possible large animal that could move into the pathway. Vehicle control component 144 may further control the vehicle speed as a result of these changes. In some examples, the computing device initiates the determined adjustment for one or more functions of the PAAV based on the machine-perceptible information in conjunction with a human operator that alters one or more functions of the PAAV based on the human-perceptible information.

Interpretation component 118 may receive infrastructure information about vehicle pathway 106 and determine one or more characteristics of vehicle pathway 106. For example, interpretation component 118 may receive images from image capture devices 102 and/or other information from systems of PAAV 110A in order to make determinations about characteristics of vehicle pathway 106. As described below, in some examples, interpretation component 118 may transmit such determinations to vehicle control component 144, which may control PAAV 110A based on the information received from interpretation component. In other examples, computing device 116 may use information from interpretation component 118 to generate notifications for a user of PAAV 110A, e.g., notifications that indicate a characteristic or condition of vehicle pathway 106.

Enhanced sign 108 represents one example of a pathway article and may include reflective, non-reflective, and/or retroreflective sheet applied to a base surface. An article message, such as but not limited to characters, images, and/or any other information, may be printed, formed, or otherwise embodied on the enhanced sign 108. The reflective, non-reflective, and/or retroreflective sheet may be applied to a base surface using one or more techniques and/or materials including but not limited to: mechanical bonding, thermal bonding, chemical bonding, or any other suitable technique for attaching retroreflective sheet to a base surface. A base surface may include any surface of an object (such as described above, e.g., an aluminum plate) to which the reflective, non-reflective, and/or retroreflective sheet may be attached. An article message may be printed, formed, or otherwise embodied on the sheeting using any one or more of an ink, a dye, a thermal transfer ribbon, a colorant, a pigment, and/or an adhesive coated film. In some examples, content is formed from or includes a multi-layer optical film, a material including an optically active pigment or dye, or an optically active pigment or dye.

Enhanced sign 108 in FIG. 1 includes article message 126A-126F (collectively "article message 126"). Article message 126 may include a plurality of components or features that provide information on one or more characteristics of a vehicle pathway. Article message 126 may include primary information (interchangeably referred to herein as human-perceptible information) that indicates general information about vehicle pathway 106. Article message 126 may include additional information (interchangeably referred to herein as machine-perceptible information) that may be configured to be interpreted by a PAAV.

In the example of FIG. 1, one component of article message 126 includes arrow 126A, a graphical symbol. The general contour of arrow 126A may represent primary information that describes a characteristic of vehicle pathway 106, such as an impending curve. For example, features arrow 126A may include the general contour of arrow 126A and may be interpreted by both a human operator of PAAV 110A as well as computing device 116 onboard PAAV 110A.

In some examples, according to aspects of this disclosure, article message 126 may include a machine readable fiducial marker 126C. The fiducial marker may also be referred to as a fiducial tag. Fiducial tag 126C may represent additional information about characteristics of pathway 106, such as the radius of the impending curve indicated by arrow 126A or a scale factor for the shape of arrow 126A. In some examples, fiducial tag 126C may indicate to computing device 116 that enhanced sign 108 is an enhanced sign rather than a conventional sign. In other examples, fiducial tag 126C may act as a security element that indicates enhanced sign 108 is not a counterfeit.

In other examples, other portions of article message 126 may indicate to computing device 116 that a pathway article is an enhanced sign. For example, according to aspects of this disclosure, article message 126 may include a change in polarization in area 126F. In this example, computing device 116 may identify the change in polarization and determine that article message 126 includes additional information regarding vehicle pathway 106.

In accordance with techniques of this disclosure, enhanced sign 108 further includes article message components such as one or more security elements 126E, separate from fiducial tag 126C. In some examples, security elements 126E may be any portion of article message 126 that is printed, formed, or otherwise embodied on enhanced sign 108 that facilitates the detection of counterfeit pathway articles.

Enhanced sign 108 may also include the additional information that represent characteristics of vehicle pathway 106 that may be printed, or otherwise disposed in locations that do not interfere with the graphical symbols, such as arrow 126A. For example, border information 126D may include additional information such as number of curves to the left and right, the radius of each curve and the distance between each curve. The example of FIG. 1 depicts border information 126D as along a top border of enhanced sign 108. In other examples, border information 126D may be placed along a partial border, or along two or more borders.

Similarly, enhanced sign 108 may include components of article message 126 that do not interfere with the graphical symbols by placing the additional machine readable information so it is detectable outside the visible light spectrum, such as area 126F. As described above in relation to fiducial tag 126C, thickened portion 126B, border information 126D, area 126F may include detailed information about additional characteristics of vehicle pathway 106 or any other information.

As described above for area 126F, some components of article message 126 may only be detectable outside the visible light spectrum. This may have advantages of avoiding interfering with a human operator interpreting enhanced sign 108, providing additional security. The non-visible components of article message 126 may include area 126F, security elements 126E and fiducial tag 126C.

Non-visible components in FIG. 1 are described for illustration purposes as being formed by different areas that either retroreflect or do not retroreflect light, non-visible components in FIG. 1 may be printed, formed, or otherwise embodied in a pathway article using any light reflecting technique in which information may be determined from non-visible components. For instance, non-visible components may be printed using visibly-opaque, infrared-transparent ink and/or visibly-opaque, infrared-opaque ink. In some examples, non-visible components may be placed on enhanced sign 108 by employing polarization techniques, such as right circular polarization, left circular polarization or similar techniques.

According to aspects of this disclosure, in operation, interpretation component 118 may receive an image of enhanced sign 108 via image capture component 102C and interpret information from article message 126. For example, interpretation component 118 may interpret fiducial tag 126C and determine that (a) enhanced sign 108 contains additional, machine readable information and (b) that enhanced sign 108 is not counterfeit.

Interpretation unit 118 may determine one or more characteristics of vehicle pathway 106 from the primary information as well as the additional information. In other words, interpretation unit 118 may determine first characteristics of the vehicle pathway from the human-perceptible information on the pathway article, and determine second characteristics from the machine-perceptible information. For example, interpretation unit 118 may determine physical properties, such as the approximate shape of an impending set of curves in vehicle pathway 106 by interpreting the shape of arrow 126A. The shape of arrow 126A defining the approximate shape of the impending set of curves may be considered the primary information. The shape of arrow 126A may also be interpreted by a human occupant of PAAV 110A.

Interpretation component 118 may also determine additional characteristics of vehicle pathway 106 by interpreting other machine-readable portions of article message 126. For example, by interpreting border information 126D and/or area 126F, interpretation component 118 may determine vehicle pathway 106 includes an incline along with a set of curves. Interpretation component 118 may signal computing device 116, which may cause vehicle control component 144 to prepare to increase power to maintain speed up the incline. Additional information from article message 126 may cause additional adjustments to one or more functions of PAAV 110A. Interpretation component 118 may determine other characteristics, such as a change in road surface. Computing device 116 may determine characteristics of vehicle pathway 106 require a change to the vehicle suspension settings and cause vehicle control component 144 to perform the suspension setting adjustment. In some examples, interpretation component 118 may receive information on the relative position of lane markings to PAAV 110A and send signals to computing device 116 that cause vehicle control component 144 to apply a force to the steering to center PAAV 110A between the lane markings.

The pathway article of this disclosure is just one piece of additional information that computing device 116, or a human operator, may consider when operating a vehicle. Other information may include information from other sensors, such as radar or ultrasound distance sensors, wireless communications with other vehicles, lane markings on the vehicle pathway captured from image capture devices 102, information from GPS, and the like. Computing device 116 may consider the various inputs (p) and consider each with a weighting value, such as in a decision equation, as local information to improve the decision process. One possible decision equation may include:

$$D = w1*p1 + w2*p2 + \ldots wn*pn + wES*pES$$

where the weights (w1-wn) may be a function of the information received from the enhanced sign (pES). In the example of a construction zone, an enhanced sign may indicate a lane shift from the construction zone. Therefore, computing device 116 may de-prioritize signals from lane marking detection systems when operating the vehicle in the construction zone.

In some examples, PAAV 110A may be a test vehicle that may determine one or more characteristics of vehicle pathway 106 and may include additional sensors as well as components to communicate to a construction device such as construction device 138. As a test vehicle, PAAV 110A may be autonomous, remotely controlled, semi-autonomous or manually controlled. One example application may be to determine a change in vehicle pathway 106 near a construction zone. Once the construction zone workers mark the change with barriers, traffic cones or similar markings, PAAV 110A may traverse the changed pathway to determine characteristics of the pathway. Some examples may include a lane shift, closed lanes, detour to an alternate route and similar changes. The computing device onboard the test device, such as computing device 116 onboard PAAV 110A, may assemble the characteristics of the vehicle pathway into data that contains the characteristics, or attributes, of the vehicle pathway.

Computing device 134 may receive a printing specification that defines one or more properties of the pathway article, such as enhanced sign 108. For example, computing device 134 may receive printing specification information included in the MUTCD from the U.S. DOT, or similar regulatory information found in other countries, that define the requirements for size, color, shape and other properties of pathway articles used on vehicle pathways. A printing specification may also include properties of manufacturing the barrier layer, retroreflective properties and other information that may be used to generate a pathway article. Machine-perceptible information may also include a confidence level of the accuracy of the machine-perceptible information. For example, a pathway marked out by a drone may not be as accurate as a pathway marked out by a test vehicle. Therefore, the dimensions of a radius of curvature, for example, may have a different confidence level based on the source of the data. The confidence level may impact the weighting of the decision equation described above.

Figure 14:
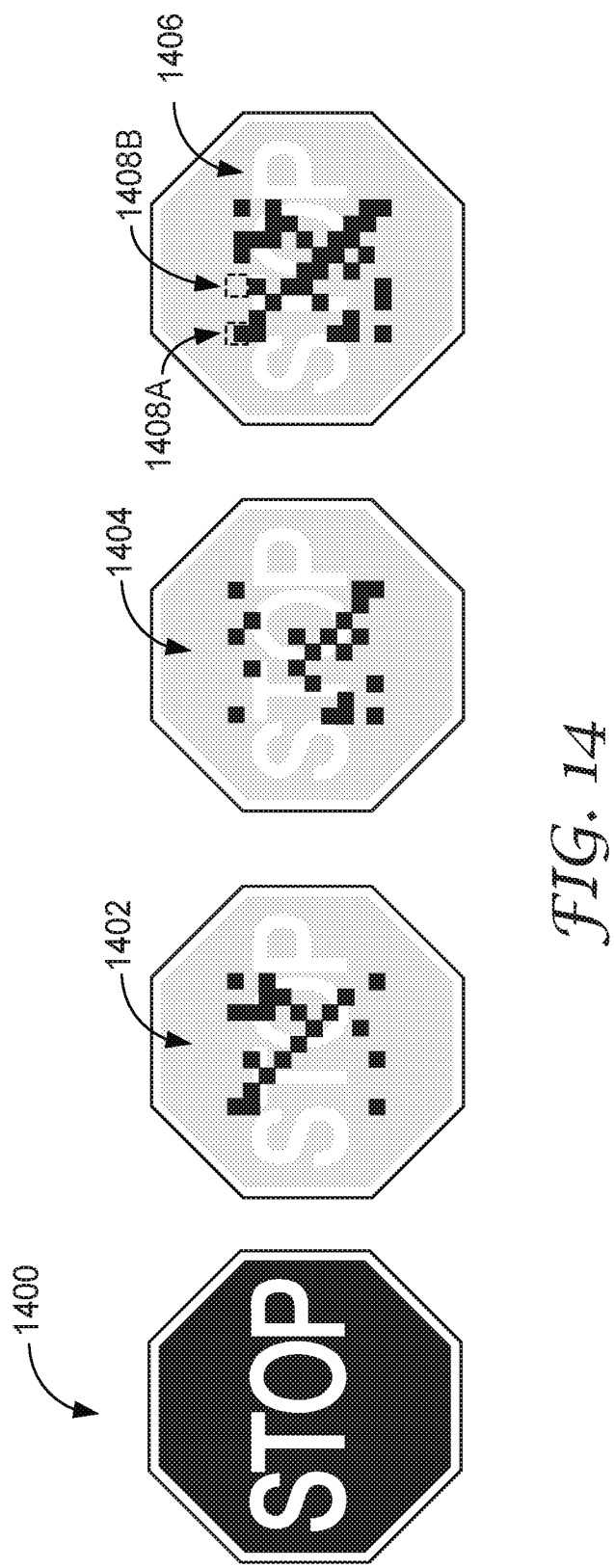
FIG. 14 illustrates a hyperspectral optical pattern that includes multiple optical sub-patterns that are visible in different light spectra, in accordance with techniques of this disclosure.

In accordance with techniques and articles of this disclosure, a hyperspectral optical pattern is described that may include multiple optical sub-patterns that are visible in different light spectra. Such techniques and articles are described in FIGS. 14-17 and other sections of this disclosure. Articles and techniques of this disclosure are described with respect to a retroreflective article, which may be a STOP sign. A retroreflective article may include an optical pattern that is not detectable in the human visible spectrum. For instance, the retroreflective article may include a human-readable article message in the visible light spectrum. The retroreflective article may include an optical pattern that corresponds to a set of information. Unlike conventional optical patterns on retroreflective articles, the optical pattern may be comprised of multiple, optical sub-patterns that are visible in different light spectra. For example, a retroreflective article may include a first optical sub-pattern that is visible in a first light spectrum. The retroreflective article may also include a second optical sub-pattern that is visible in a second light spectrum. In some examples, the first and second light spectra are different. In some examples the first and second light spectra do not overlap. As shown in FIG. 14, a combination of the first optical sub-pattern 1402 and the second optical sub-pattern 1404 form or represent optical pattern 1406 as shown with the retroreflective article 1400, which can be interpreted or decoded to determine a set of information that may be used to perform one or more operations within a computing device. Various examples are further described in FIGS. 14-17 and other sections of this disclosure.

Figure 16:
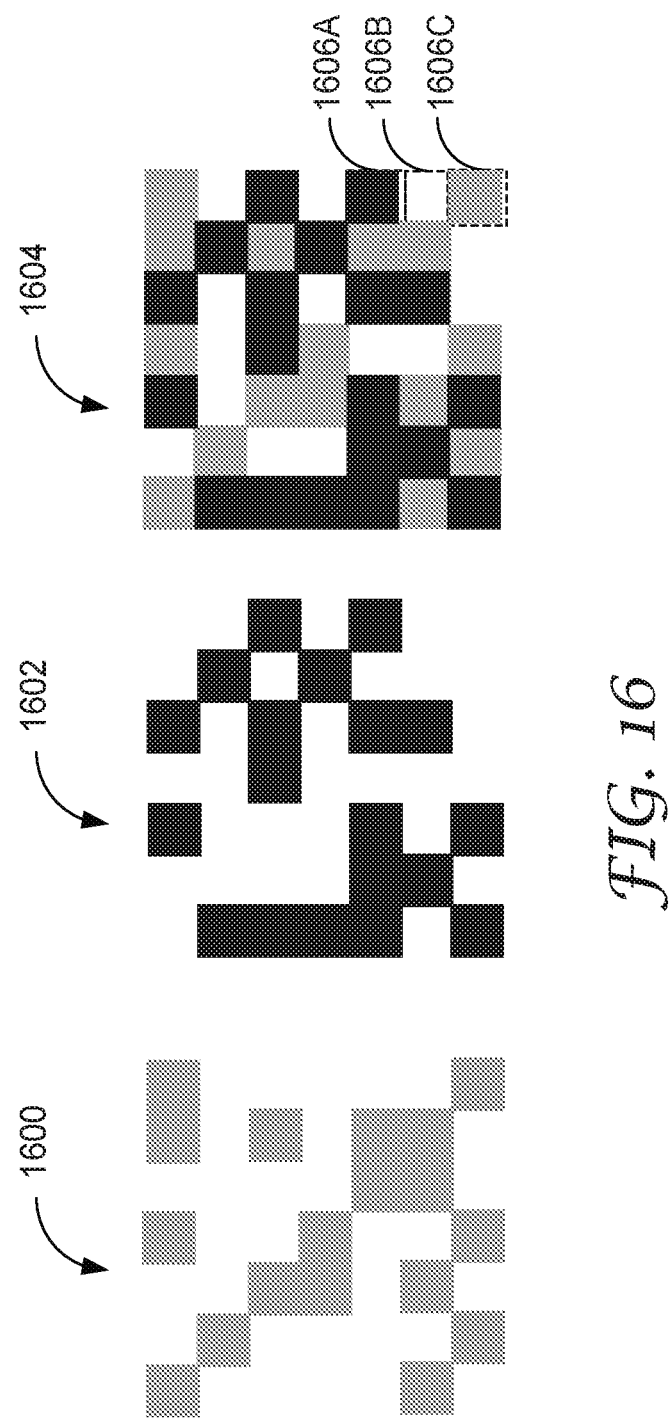
FIG. 16 illustrates a hyperspectral optical pattern that may be processed by a computing device, in accordance with techniques of this disclosure.

In accordance with techniques of this disclosure and as described in FIG. 16 and other sections of this disclosure, a computing device may receive, from a light capture device, a first image of a retroreflective article comprising a first optical sub-pattern that is visible in a first light spectrum, wherein the first optical sub-pattern is included in an optical pattern embodied on the retroreflective substrate. The computing device may receive a second image of the retroreflective article comprising a second optical sub-pattern that is visible in a second light spectrum, wherein the second optical sub-pattern is included in the optical pattern embodied on the retroreflective substrate. In some examples, the computing device may interpret the first optical sub-pattern in combination with the second-optical sub-pattern to determine a set of information represented by the optical pattern that comprises the first optical sub-pattern and the second optical sub-pattern. The computing device may perform at least one operation based at least in part on the set of information. Various examples are further described in FIG. 16 and other sections of this disclosure.

Figure 6:
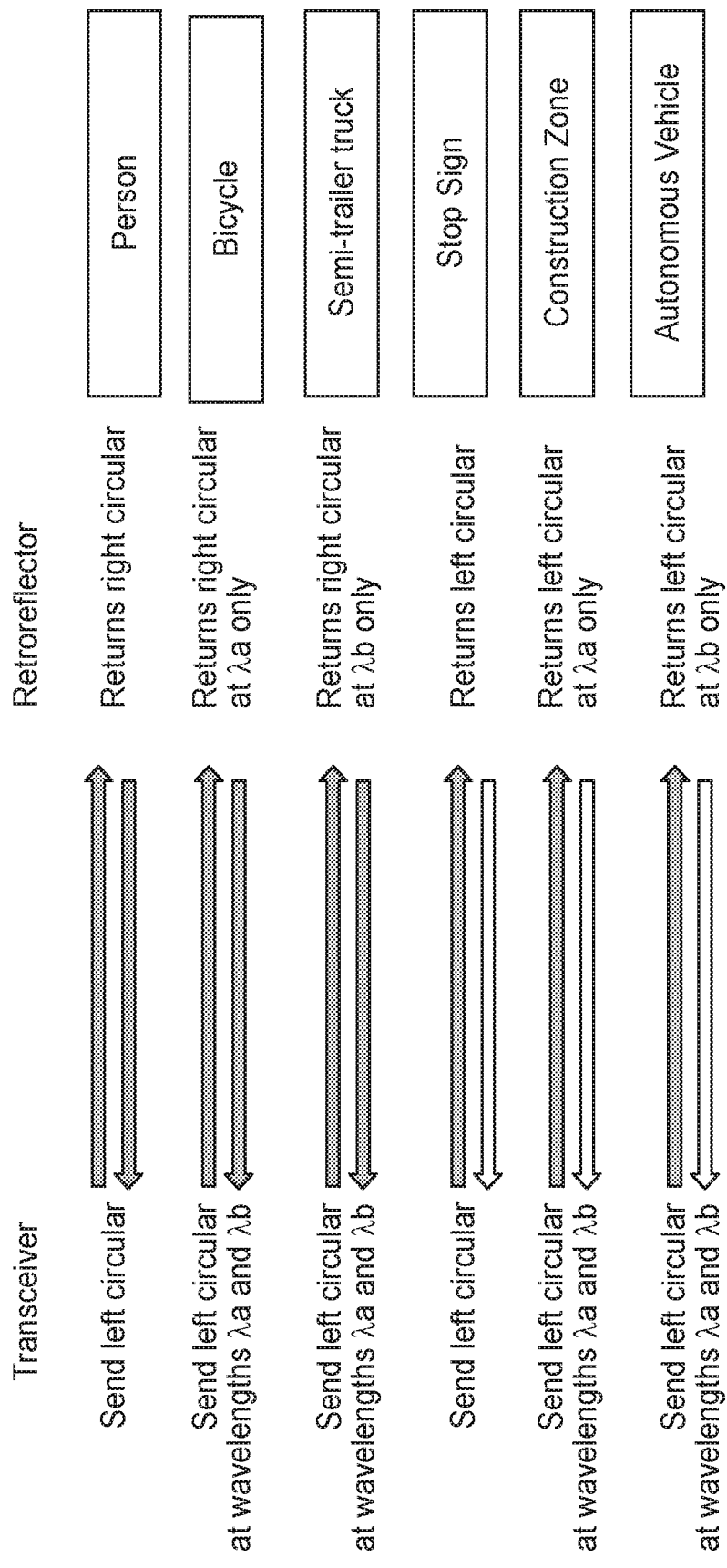
FIG. 6 illustrates an example of mappings between retroreflective properties and values, in accordance with techniques of this disclosure.

In accordance with techniques of this disclosure and as described in FIG. 6, a retroreflective article may include an optical pattern, such as described in this disclosure, which is read and processed by an image capture device and computing device. However, due to limitations on image resolution at far distances, it may not be possible for an image capture device and/or computing device to obtain an image with a resolution that is sufficient to interpret or otherwise decode the optical pattern into information at certain distances. Such distances may be greater than a threshold, where such resolution becomes insufficient in the decoding or interpretation process.

Although decoding or interpretation of such optical codes may not be possible certain distance due to the aforementioned resolution limitations, an image or light capture device may still be capable of receiving retroreflected light. As described in FIG. 6, a computing device may determine information from one or more retroreflective properties of light received at a light capture device. Examples of retroreflective properties as described in this disclosure may include light polarization direction or wavelength, although many other examples are described and within the spirit and scope of this disclosure. Because the retroreflective properties of light returned from the retroreflective article may be detected at distances greater than a distance at which an optical pattern may be resolved, techniques and articles of this disclosure may determine a first set of information based on retroreflective properties of light returned from a retroreflective article at a distance between the light capture device and computing device that is greater than a distance at which information for an optical pattern can be interpreted or decoded. Accordingly, at distances further away, retroreflective properties of light returned from a retroreflective article may be used to determine the first set of information, and as the distance between the image or light capture device and the retroreflective article decreases, the optical pattern may be decoded or interpreted to obtain a second set of information. Although an optical pattern has been described, any spatial property of an object that is resolvable may be used to determine the second set of information. Various examples are further described in FIG. 6 and other sections of this disclosure.

Figure 2:
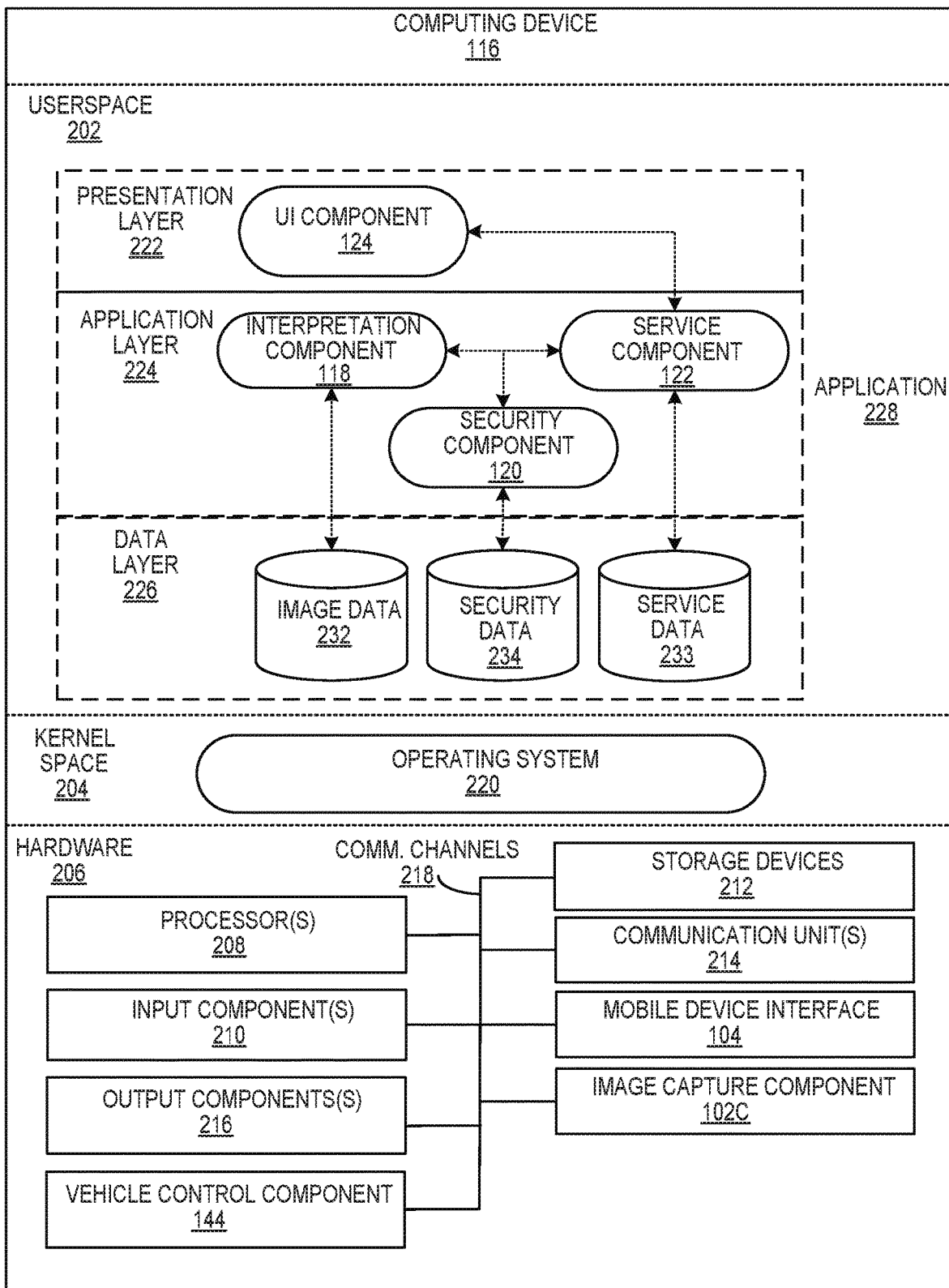
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one example of a computing device. Many other examples of computing device 116 may be used in other instances and may include a subset of the components included in example computing device 116 or may include additional components not shown example computing device 116 in FIG. 2.

In some examples, computing device 116 may be a server, tablet computing device, smartphone, wrist- or head-worn computing device, laptop, desktop computing device, or any other computing device that may run a set, subset, or superset of functionality included in application 228. In some examples, computing device 116 may correspond to vehicle computing device 116 onboard PAAV 110A, depicted in FIG. 1. In other examples, computing device 116 may also be part of a system or device that produces signs and correspond to computing device 134 depicted in FIG. 1.

As shown in the example of FIG. 2, computing device 116 may be logically divided into user space 202, kernel space 204, and hardware 206. Hardware 206 may include one or more hardware components that provide an operating environment for components executing in user space 202 and kernel space 204. User space 202 and kernel space 204 may represent different sections or segmentations of memory, where kernel space 204 provides higher privileges to processes and threads than user space 202. For instance, kernel space 204 may include operating system 220, which operates with higher privileges than components executing in user space 202. In some examples, any components, functions, operations, and/or data may be included or executed in kernel space 204 and/or implemented as hardware components in hardware 206.

As shown in FIG. 2, hardware 206 includes one or more processors 208, input components 210, storage devices 212, communication units 214, output components 216, mobile device interface 104, image capture component 102C, and vehicle control component 144. Processors 208, input components 210, storage devices 212, communication units 214, output components 216, mobile device interface 104, image capture component 102C, and vehicle control component 144 may each be interconnected by one or more communication channels 218. Communication channels 218 may interconnect each of the components 102C, 104, 208, 210, 212, 214, 216, and 144 for inter-component communications (physically, communicatively, and/or operatively). In some examples, communication channels 218 may include a hardware bus, a network connection, one or more inter-process communication data structures, or any other components for communicating data between hardware and/or software.

One or more processors 208 may implement functionality and/or execute instructions within computing device 116. For example, processors 208 on computing device 116 may receive and execute instructions stored by storage devices 212 that provide the functionality of components included in kernel space 204 and user space 202. These instructions executed by processors 208 may cause computing device 116 to store and/or modify information, within storage devices 212 during program execution. Processors 208 may execute instructions of components in kernel space 204 and user space 202 to perform one or more operations in accordance with techniques of this disclosure. That is, components included in user space 202 and kernel space 204 may be operable by processors 208 to perform various functions described herein.

One or more input components 210 of computing device 116 may receive input. Examples of input are tactile, audio, kinetic, and optical input, to name only a few examples. Input components 210 of computing device 116, in one example, include a mouse, keyboard, voice responsive system, video camera, buttons, control pad, microphone or any other type of device for detecting input from a human or machine. In some examples, input component 210 may be a presence-sensitive input component, which may include a presence-sensitive screen, touch-sensitive screen, etc.

One or more communication units 214 of computing device 116 may communicate with external devices by transmitting and/or receiving data. For example, computing device 116 may use communication units 214 to transmit and/or receive radio signals on a radio network such as a cellular radio network. In some examples, communication units 214 may transmit and/or receive satellite signals on a satellite network such as a Global Positioning System (GPS) network. Examples of communication units 214 include a network interface card (e.g. such as an Ethernet card), an optical transceiver, a radio frequency transceiver, a GPS receiver, or any other type of device that can send and/or receive information. Other examples of communication units 214 may include Bluetooth®, GPS, 3G, 4G, and Wi-Fi® radios found in mobile devices as well as Universal Serial Bus (USB) controllers and the like.

In some examples, communication units 214 may receive data that includes one or more characteristics of a vehicle pathway. In examples where computing device 116 is part of a vehicle, such as PAAV 110A depicted in FIG. 1, communication units 214 may receive information about a pathway article from an image capture device, as described in relation to FIG. 1. In other examples, such as examples where computing device 116 is part of a system or device that produces signs, communication units 214 may receive data from a test vehicle, handheld device or other means that may gather data that indicates the characteristics of a vehicle pathway, as described above in FIG. 1 and in more detail below. Computing device 116 may receive updated information, upgrades to software, firmware and similar updates via communication units 214.

One or more output components 216 of computing device 116 may generate output. Examples of output are tactile, audio, and video output. Output components 216 of computing device 116, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT)

monitor, liquid crystal display (LCD), Light-Emitting Diode (LED) or any other type of device for generating tactile, audio, and/or visual output. Output components 216 may be integrated with computing device 116 in some examples.

In other examples, output components 216 may be physically external to and separate from computing device 116, but may be operably coupled to computing device 116 via wired or wireless communication. An output component may be a built-in component of computing device 116 located within and physically connected to the external packaging of computing device 116 (e.g., a screen on a mobile phone). In another example, a presence-sensitive display may be an external component of computing device 116 located outside and physically separated from the packaging of computing device 116 (e.g., a monitor, a projector, etc. that shares a wired and/or wireless data path with a tablet computer).

Hardware 206 may also include vehicle control component 144, in examples where computing device 116 is onboard a PAAV. Vehicle control component 144 may have the same or similar functions as vehicle control component 144 described in relation to FIG. 1.

One or more storage devices 212 within computing device 116 may store information for processing during operation of computing device 116. In some examples, storage device 212 is a temporary memory, meaning that a primary purpose of storage device 212 is not long-term storage. Storage devices 212 on computing device 116 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 212, in some examples, also include one or more computer-readable storage media. Storage devices 212 may be configured to store larger amounts of information than volatile memory. Storage devices 212 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 212 may store program instructions and/or data associated with components included in user space 202 and/or kernel space 204.

As shown in FIG. 2, application 228 executes in userspace 202 of computing device 116. Application 228 may be logically divided into presentation layer 222, application layer 224, and data layer 226. Presentation layer 222 may include user interface (UI) component 228, which generates and renders user interfaces of application 228. Application 228 may include, but is not limited to: UI component 124, interpretation component 118, security component 120, and one or more service components 122. For instance, application layer 224 may interpretation component 118, service component 122, and security component 120. Presentation layer 222 may include UI component 124.

Data layer 226 may include one or more datastores. A datastore may store data in structure or unstructured form. Example datastores may be any one or more of a relational database management system, online analytical processing database, table, or any other suitable structure for storing data.

Security data 234 may include data specifying one or more validation functions and/or validation configurations. Service data 233 may include any data to provide and/or resulting from providing a service of service component 122. For instance, service data may include information about pathway articles (e.g., security specifications), user information, or any other information. Image data 232 may include one or more images that are received from one or more image capture devices, such as image capture devices 102 described in relation to FIG. 1. In some examples, the images are bitmaps, Joint Photographic Experts Group images (JPEGs), Portable Network Graphics images (PNGs), or any other suitable graphics file formats.

In the example of FIG. 2, one or more of communication units 214 may receive, from an image capture device, an image of a pathway article that includes an article message, such as article message 126 in FIG. 1. In some examples, UI component 124 or any one or more components of application layer 224 may receive the image of the pathway article and store the image in image data 232.

In response to receiving the image, interpretation component 118 may determine that a pathway article is an enhanced sign, such as enhanced sign 108. The pathway article may include at least one article message that indicates one or more characteristics of a pathway for the PAAV. The article message may include primary, or human-perceptible information that indicates one or more first characteristics of the vehicle pathway. An enhanced sign may also include additional or machine-perceptible information that indicates the one or more additional characteristics of the vehicle pathway. In some examples the additional information may information include one or more of a predicted trajectory, an incline change, a change in width, a change in road surface, a defect in the pathway or other potential hazard, the location of other pathway articles, speed limit change, or any other information. An example of a predicted trajectory may include the shape of the vehicle pathway depicted by arrow 126A in FIG. 1. As described above for area 126F, in some examples the additional information includes machine readable information that is detectable outside the visible light spectrum, such as by IR, a change in polarization or similar techniques.

Interpretation component 118 may determine one or more characteristics of a vehicle pathway and transmit data representative of the characteristics to other components of computing device 116, such as service component 122. Interpretation component 118 may determine the characteristics of the vehicle pathway indicate an adjustment to one or more functions of the vehicle. For example, the enhanced sign may indicate that the vehicle is approaching a construction zone and there is a change to the vehicle pathway. Computing device 116 may combine this information with other information from other sensors, such as image capture devices, GPS information, information from network 114 and similar information to adjust the speed, suspension or other functions of the vehicle through vehicle control component 144.

Similarly, computing device 116 may determine one or more conditions of the vehicle. Vehicle conditions may include a weight of the vehicle, a position of a load within the vehicle, a tire pressure of one or more vehicle tires, transmission setting of the vehicle and a powertrain status of the vehicle. For example, a PAAV with a large powertrain may receive different commands when encountering an incline in the vehicle pathway than a PAAV with a less powerful powertrain (i.e. motor).

Computing device may also determine environmental conditions in a vicinity of the vehicle. Environmental conditions may include air temperature, precipitation level, precipitation type, incline of the vehicle pathway, presence of other vehicles and estimated friction level between the vehicle tires and the vehicle pathway.

Computing device 116 may combine information from vehicle conditions, environmental conditions, interpretation component 118 and other sensors to determine adjustments to the state of one or more functions of the vehicle, such as by operation of vehicle control component 144, which may interoperate with any components and/or data of application 228. For example, interpretation component 118 may determine the vehicle is approaching a curve with a downgrade, based on interpreting an enhanced sign on the vehicle pathway. Computing device 116 may determine one speed for dry conditions and a different speed for wet conditions. Similarly, computing device 116 onboard a heavily loaded freight truck may determine one speed while computing device 116 onboard a sports car may determine a different speed.

In some examples, computing device 116 may determine the condition of the pathway by considering a traction control history of a PAAV. For example, if the traction control system of a PAAV is very active, computing device 116 may determine the friction between the pathway and the vehicle tires is low, such as during a snow storm or sleet.

The pathway articles of this disclosure may include one or more security elements, such as security element 126E depicted in FIG. 1, to help determine if the pathway article is counterfeit. Security is a concern with intelligent infrastructure to minimize the impact of hackers, terrorist activity or crime. For example, a criminal may attempt to redirect an autonomous freight truck to an alternate route to steal the cargo from the truck. An invalid security check may cause computing device 116 to give little or no weight to the information in the sign as part of the decision equation to control a PAAV.

As discussed above, for the machine-readable portions of the article message, the properties of security marks may include but are not limited to location, size, shape, pattern, composition, retroreflective properties, appearance under a given wavelength, or any other spatial characteristic of one or more security marks. Security component 120 may determine whether pathway article, such as enhanced sign 108 is counterfeit based at least in part on determining whether the at least one symbol, such as the graphical symbol, is valid for at least one security element. As described in relation to FIG. 1 security component 120 may include one or more validation functions and/or one or more validation conditions on which the construction of enhanced sign 108 is based. In some examples a fiducial marker, such as fiducial tag 126C may act as a security element. In other examples a pathway article may include one or more security elements such as security element 126E.

In FIG. 2, security component 120 determines, using a validation function based on the validation condition in security data 234, whether the pathway article depicted in FIG. 1 is counterfeit. Security component 120, based on determining that the security elements satisfy the validation configuration, generate data that indicates enhanced sign 108 is authentic (e.g., not a counterfeit). If security elements and the article message in enhanced sign 108 did not satisfy the validation criteria, security component 120 may generate data that indicates pathway article is not authentic (e.g., counterfeit) or that the pathway article is not being read correctly.

A pathway article may not be read correctly because it may be partially occluded or blocked, the image may be distorted or the pathway article is damaged. For example, in heavy snow or fog, or along a hot highway subject to distortion from heat rising from the pathway surface, the image of the pathway article may be distorted. In another example, another vehicle, such as a large truck, or a fallen tree limb may partially obscure the pathway article. The security elements, or other components of the article message, may help determine if an enhanced sign is damaged. If the security elements are damaged or distorted, security component 120 may determine the enhanced sign is invalid.

For some examples of computer vision systems, such as may be part of PAAV 110A, the pathway article may be visible in hundreds of frames as the vehicle approaches the enhanced sign. The interpretation of the enhanced sign may not necessarily rely on a single, successful capture image. At a far distance, the system may recognize the enhanced sign. As the vehicle gets closer, the resolution may improve and the confidence in the interpretation of the sign information may increase. The confidence in the interpretation may impact the weighting of the decision equation and the outputs from vehicle control component 144.

Service component 122 may perform one or more operations based on the data generated by security component 120 that indicates whether the pathway article is a counterfeit. Service component 122 may, for example, query service data 233 to retrieve a list of recipients for sending a notification or store information that indicates details of the image of the pathway article (e.g., object to which pathway article is attached, image itself, metadata of image (e.g., time, date, location, etc.)). In response to, for example, determining that the pathway article is a counterfeit, service component 122 may send data to UI component 124 that causes UI component 124 to generate an alert for display. UI component 124 may send data to an output component of output components 216 that causes the output component to display the alert.

Similarly, service component 122, or some other component of computing device 116, may cause a message to be sent through communication units 214 that the pathway article is counterfeit. In some examples the message may be sent to law enforcement, those responsible for maintenance of the vehicle pathway and to other vehicles, such as vehicles nearby the pathway article.

As with other portions of the article message, such as border information 126D and area 126F, in some examples, security component 120 may use both a visible light image captured under visible lighting and an IR light image captured under IR light to determine whether a pathway article is counterfeit. For instance, if counterfeiter places an obstructing material (e.g., opaque, non-reflective, etc.) over a security element to make it appear the opposite of what it is (e.g., make an active element appear inactive or vice versa), then security component 120 may determine from the visible light image that obstructing material has been added the pathway article. Therefore, even if the IR light image includes a valid configuration of security elements (due to the obstructing material at various locations), security component 120 may determine that the visible light image includes the obstructing material and is therefore counterfeit.

In some examples, security component 120 may determine one or more predefined image regions (e.g., stored in security data 234) that correspond to security elements for the pathway article. Security component 120 may inspect one or more of the predefined image regions within the image of the pathway article and determine, based at least in part on one or more pixel values in the predefined image regions, one or more values that represent the validation information.

In some examples, security component 120, when determining, based at least in part on one or more pixel values in the predefined image regions, one or more values that represent the validation information further comprises may further determine one or more values that represent the validation information based at least in part one whether the one or more predefined image regions of security elements are active or inactive. In some examples, security component 120 may determine the validation information that is detectable outside the visible light spectrum from the at least one security element further by determining the validation information based at least in part on at least one of a location, shape, size, pattern, composition of the at least one security element.

In some examples, security component 120 may determine whether the pathway article is counterfeit or otherwise invalid based on whether a combination of one or more symbols of the article message and the validation information represent a valid association. Therefore, an invalid enhanced sign may be from a variety of factors including counterfeit, damage, unreadable because of weather or other causes.

The techniques of this disclosure may have an advantage in that the enhanced signs may be created using current printing technology and interpreted with baseline computer vision systems. The techniques of this disclosure may also provide advantages over barcode or similar systems in that a barcode reader may require a look-up database or "dictionary." Some techniques of this disclosure, such as interpreting the shape of arrow 126A in FIG. 1, may not require a look-up or other decoding to determine one or more characteristics of a vehicle pathway. The techniques of this disclosure include small changes to existing signs that may not change human interpretation, while taking advantage of existing computer vision technology to interpret an article message, such as a graphic symbol. Existing graphic symbols on many conventional signs may not depict the actual trajectory of the vehicle pathway. Graphical symbols on enhanced signs of this disclosure may describe actual pathway information, along with additional machine readable information. In this manner, the techniques of this disclosure may help to ensure that autonomous, semi-autonomous and manually operated vehicles are responding to the same cues. The enhanced signs of this disclosure may also provide redundancy at the pathway level to cloud, GPS and other information received by PAAVs. Also, because the enhanced signs of this disclosure include small changes to existing signs, the techniques of this disclosure may be more likely to receive approval from regulatory bodies that approve signs for vehicle pathways.

Techniques of this disclosure may also have advantages of improved safety over conventional signs. For example, one issue with changes in vehicle pathways, such as a construction zone, is driver uncertainty and confusion over the changes. The uncertainty may cause a driver to brake suddenly, take the incorrect path or some other response. Techniques of this disclosure may ensure human operators have a better understanding of changes to vehicle pathway, along with the autonomous and semi-autonomous vehicles. This may improve safety, not only for drivers but for the construction workers, in examples of vehicle pathways through construction zones.

Figure 3:
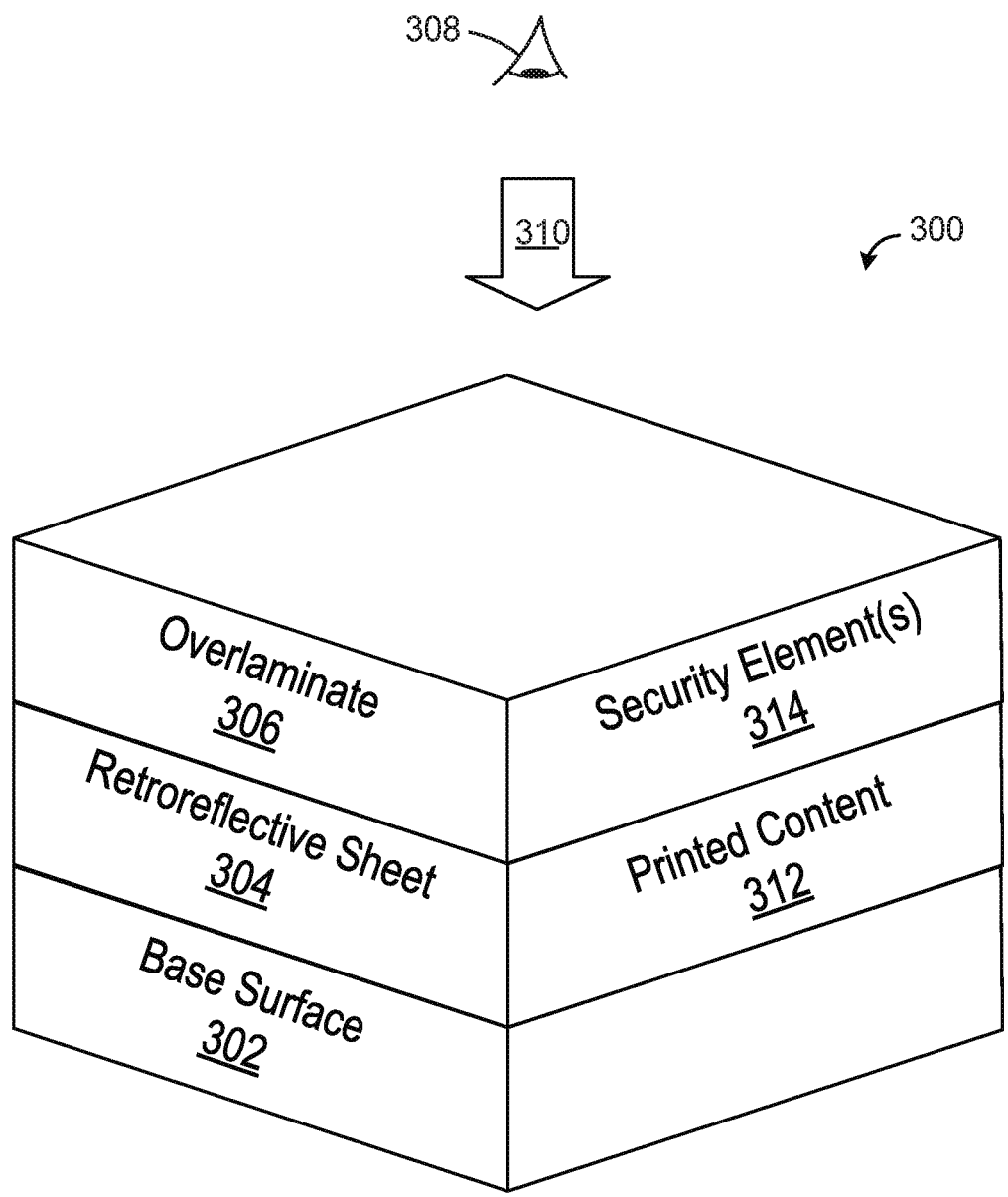
FIG. 3 is a conceptual diagram of a cross-sectional view of a pathway article in accordance with techniques of this disclosure.

FIG. 3 is a conceptual diagram of a cross-sectional view of a pathway article in accordance with techniques of this disclosure. In some examples, such as an enhanced sign, a pathway article may comprise multiple layers. For purposes of illustration in FIG. 3, a pathway article 300 may include a base surface 302. Base surface 302 may be an aluminum plate or any other rigid, semi-rigid, or flexible surface. Retroreflective sheet 304 may be a retroreflective sheet as described in this disclosure. A layer of adhesive (not shown) may be disposed between retroreflective sheet 304 and base surface 302 to adhere retroreflective sheet 304 to base surface 302.

Pathway article may include an overlaminate 306 that is formed or adhered to retroreflective sheet 304. Overlaminate 306 may be constructed of a visibly-transparent, infrared opaque material, such as but not limited to multilayer optical film as disclosed in U.S. Pat. No. 8,865,293, which is expressly incorporated by reference herein in its entirety. In some construction processes, retroreflective sheet 304 may be printed and then overlaminate 306 subsequently applied to reflective sheet 304. A viewer 308, such as a person or image capture device, may view pathway article 300 in the direction indicated by the arrow 310.

As described in this disclosure, in some examples, an article message may be printed or otherwise included on a retroreflective sheet. In such examples, an overlaminate may be applied over the retroreflective sheet, but the overlaminate may not contain an article message. In the example of FIG. 3, visible portions 312 of the article message may be included in retroreflective sheet 304, but non-visible portions 314 of the article message may be included in overlaminate 306. In some examples, a non-visible portion may be created from or within a visibly-transparent, infrared opaque material that forms an overlaminate. European publication No. EP0416742 describes recognition symbols created from a material that is absorptive in the near infrared spectrum but transparent in the visible spectrum. Suitable near infrared absorbers/visible transmitter materials include dyes disclosed in U.S. Pat. No. 4,581,325. U.S. Pat. No. 7,387,393 describes license plates including infrared-blocking materials that create contrast on a license plate. U.S. Pat. No. 8,865,293 describes positioning an infrared-reflecting material adjacent to a retroreflective or reflective substrate, such that the infrared-reflecting material forms a pattern that can be read by an infrared sensor when the substrate is illuminated by an infrared radiation source. EP0416742 and U.S. Pat. Nos. 4,581,325, 7,387,393 and 8,865,293 are herein expressly incorporated by reference in their entireties. In some examples, overlaminate 306 may be etched with one or more visible or non-visible portions.

In some examples, if overlaminate includes non-visible portions 314 and retroreflective sheet 304 includes visible portions 312 of article message, an image capture device may capture two separate images, where each separate image is captured under a different lighting spectrum or lighting condition. For instance, the image capture device may capture a first image under a first lighting spectrum that spans a lower boundary of infrared light to an upper boundary of 900 nm. The first image may indicate which encoding units are active or inactive. The image capture device may capture a second image under a second lighting spectrum that spans a lower boundary of 900 nm to an upper boundary of infrared light. The second image may indicate which portions of the article message are active or inactive (or present or not present). Any suitable boundary values may be used. In some examples, multiple layers of overlaminate, rather than a single layer of overlaminate 306, may be disposed on retroreflective sheet 304. One or more of the multiple layers of overlaminate may have one or more portions of the article message. Techniques described in this disclosure with respect to the article message may be applied to any of the examples described in FIG. 3 with multiple layers of overlaminate.

In some examples, a laser in a construction device, such as construction device as described in this disclosure, may engrave the article message onto sheeting, which enables embedding markers specifically for predetermined meanings. Example techniques are described in U.S. Provisional Patent Application 62/264,763, filed on Dec. 8, 2015, which is hereby incorporated by reference in its entirety. In such examples, the portions of the article message in the pathway article can be added at print time, rather than being encoded during sheeting manufacture. In some examples, an image capture device may capture an image in which the engraved security elements or other portions of the article message are distinguishable from other content of the pathway article. In some examples the article message may be disposed on the sheeting at a fixed location while in other examples, the article message may be disposed on the sheeting using a mobile construction device, as described above.

Figure 4A:
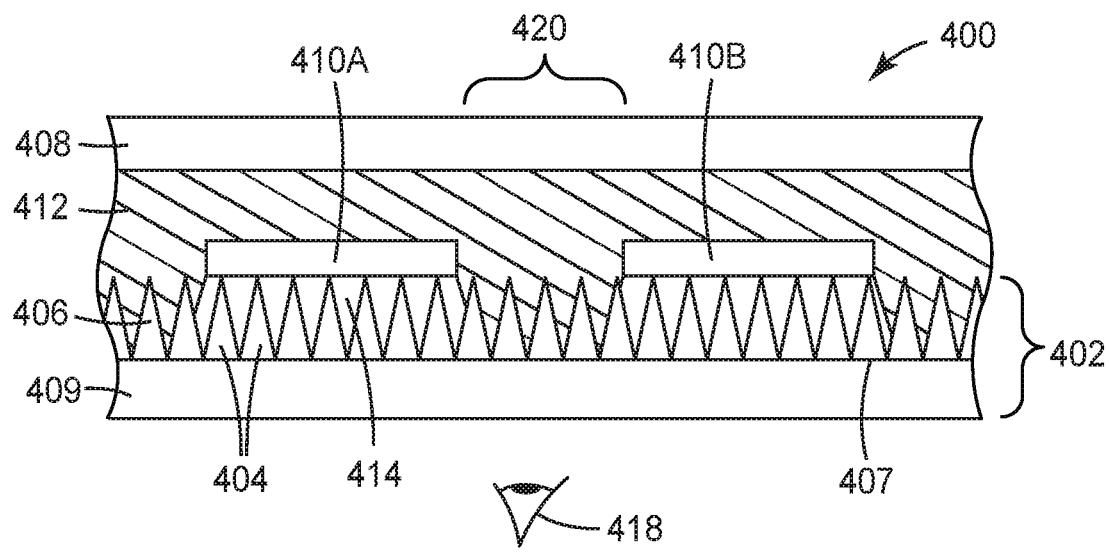
FIGS. 4A and 4B illustrate cross-sectional views of portions of an article message formed on a retroreflective sheet, in accordance with one or more techniques of this disclosure.
Figure 4B:
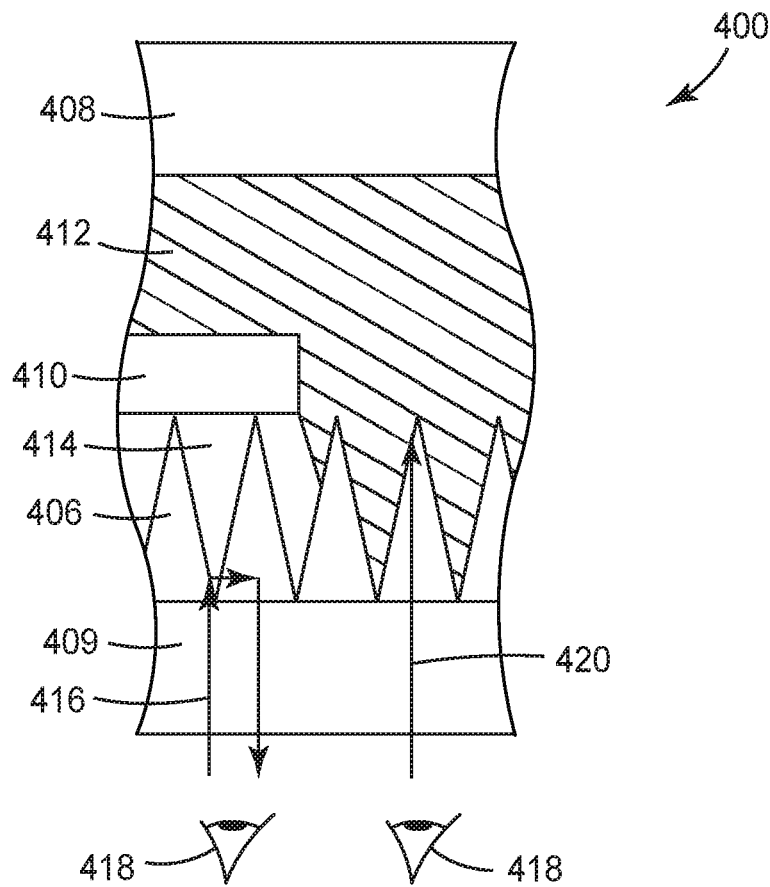

FIGS. 4A and 4B illustrate cross-sectional views of portions of an article message formed on a retroreflective sheet, in accordance with one or more techniques of this disclosure. Retroreflective article 400 includes a retroreflective layer 402 including multiple cube corner elements 404 that collectively form a structured surface 406 opposite a major surface 407. The optical elements can be full cubes, truncated cubes, or preferred geometry (PG) cubes as described in, for example, U.S. Pat. No. 7,422,334, incorporated herein by reference in its entirety. The specific retroreflective layer 402 shown in FIGS. 4A and 4B includes a body layer 409, but those of skill will appreciate that some examples do not include an overlay layer. One or more barrier layers 410 are positioned between retroreflective layer 402 and conforming layer 412, creating a low refractive index area 414. Barrier layers 410 form a physical "barrier" between cube corner elements 404 and conforming layer 412. Barrier layer 410 can directly contact or be spaced apart from or can push slightly into the tips of cube corner elements 404. Barrier layers 410 have a characteristic that varies from a characteristic in one of (1) the areas 412 not including barrier layers (view line of light ray 416) or (2) another barrier layer 412. Exemplary characteristics include, for example, color and infrared absorbency.

In general, any material that prevents the conforming layer material from contacting cube corner elements 404 or flowing or creeping into low refractive index area 414 can be used to form the barrier layer Exemplary materials for use in barrier layer 410 include resins, polymeric materials, dyes, inks (including color-shifting inks), vinyl, inorganic materials, UV-curable polymers, multi-layer optical films (including, for example, color-shifting multi-layer optical films), pigments, particles, and beads. The size and spacing of the one or more barrier layers can be varied. In some examples, the barrier layers may form a pattern on the retroreflective sheet. In some examples, one may wish to reduce the visibility of the pattern on the sheeting. In general, any desired pattern can be generated by combinations of the described techniques, including, for example, indicia such as letters, words, alphanumerics, symbols, graphics, logos, or pictures. The patterns can also be continuous, discontinuous, monotonic, dotted, serpentine, any smoothly varying function, stripes, varying in the machine direction, the transverse direction, or both; the pattern can form an image, logo, or text, and the pattern can include patterned coatings and/or perforations. The pattern can include, for example, an irregular pattern, a regular pattern, a grid, words, graphics, images lines, and intersecting zones that form cells.

The low refractive index area 414 is positioned between (1) one or both of barrier layer 410 and conforming layer 412 and (2) cube corner elements 404. The low refractive index area 414 facilitates total internal reflection such that light that is incident on cube corner elements 404 adjacent to a low refractive index area 414 is retroreflected. As is shown in FIG. 4B, a light ray 416 incident on a cube corner element 404 that is adjacent to low refractive index layer 414 is retroreflected back to viewer 418. For this reason, an area of retroreflective article 400 that includes low refractive index layer 414 can be referred to as an optically active area. In contrast, an area of retroreflective article 400 that does not include low refractive index layer 414 can be referred to as an optically inactive area because it does not substantially retroreflect incident light. As used herein, the term "optically inactive area" refers to an area that is at least 50% less optically active (e.g., retroreflective) than an optically active area. In some examples, the optically inactive area is at least 40% less optically active, or at least 30% less optically active, or at least 20% less optically active, or at least 10% less optically active, or at least at least 5% less optically active than an optically active area.

Low refractive index layer 414 includes a material that has a refractive index that is less than about 1.30, less than about 1.25, less than about 1.2, less than about 1.15, less than about 1.10, or less than about 1.05. In general, any material that prevents the conforming layer material from contacting cube corner elements 404 or flowing or creeping into low refractive index area 414 can be used as the low refractive index material. In some examples, barrier layer 410 has sufficient structural integrity to prevent conforming layer 412 from flowing into a low refractive index area 414. In such examples, low refractive index area may include, for example, a gas (e.g., air, nitrogen, argon, and the like). In other examples, low refractive index area includes a solid or liquid substance that can flow into or be pressed into or onto cube corner elements 404. Exemplary materials include, for example, ultra-low index coatings (those described in PCT Patent Application No. PCT/US2010/031290), and gels.

The portions of conforming layer 412 that are adjacent to or in contact with cube corner elements 404 form non-optically active (e.g., non-retroreflective) areas or cells. In some examples, conforming layer 412 is optically opaque. In some examples conforming layer 412 has a white color.

In some examples, conforming layer 412 is an adhesive. Exemplary adhesives include those described in PCT Patent Application No. PCT/US2010/031290. Where the conforming layer is an adhesive, the conforming layer may assist in holding the entire retroreflective construction together and/or the viscoelastic nature of barrier layers 410 may prevent wetting of cube tips or surfaces either initially during fabrication of the retroreflective article or over time.

In some examples, conforming layer 412 is a pressure sensitive adhesive. The PSTC (pressure sensitive tape council) definition of a pressure sensitive adhesive is an adhesive that is permanently tacky at room temperature which adheres to a variety of surfaces with light pressure (finger pressure) with no phase change (liquid to solid). While most adhesives (e.g., hot melt adhesives) require both heat and pressure to conform, pressure sensitive adhesives typically only require pressure to conform. Exemplary pressure sensitive adhesives include those described in U.S. Pat. No. 6,677,030. Barrier layers 410 may also prevent the pressure sensitive adhesive from wetting out the cube corner sheeting. In other examples, conforming layer 412 is a hot-melt adhesive.

In some examples, a pathway article may use a non-permanent adhesive to attach the article message to the base surface. This may allow the base surface to be re-used for a different article message. Non-permanent adhesive may have advantages in areas such as roadway construction zones where the vehicle pathway may change frequently.

In the example of FIG. 4A, a non-barrier region 420 does not include a barrier layer, such as barrier layer 410. As such, light may reflect with a lower intensity than barrier layers 410A-410B. In some examples, non-barrier region 420 may correspond to an "active" security element. For instance, the entire region or substantially all of image region 142A may be a non-barrier region 420. In some examples, substantially all of image region 142A may be a non-barrier region that covers at least 50% of the area of image region 142A. In some examples, substantially all of image region 142A may be a non-barrier region that covers at least 75% of the area of image region 142A. In some examples, substantially all of image region 142A may be a non-barrier region that covers at least 90% of the area of image region 142A. In some examples, a set of barrier layers (e.g., 410A, 410B) may correspond to an "inactive" security element as described in FIG. 1. In the aforementioned example, an "inactive" security element as described in FIG. 1 may have its entire region or substantially all of image region 142D filled with barrier layers. In some examples, substantially all of image region 142D may be a non-barrier region that covers at least 75% of the area of image region 142D. In some examples, substantially all of image region 142D may be a non-barrier region that covers at least 90% of the area of image region 142D. In the foregoing description of FIG. 4 with respect to security layers, in some examples, non-barrier region 420 may correspond to an "inactive" security element while an "active" security element may have its entire region or substantially all of image region 142D filled with barrier layers.

In FIGS. 3 and 4, an article message may be printed using a flexographic printing process. For instance, enhanced sign 108 may include a base layer (e.g., an aluminum sheet), an adhesive layer disposed on the base layer, a structured surface disposed on the adhesive layer, and an overlay layer disposed on the structured surface such as described in U.S. Publication US2013/0034682, US2013/0114142, US2014/0368902, US2015/0043074, which are hereby expressly incorporated by reference in their entireties. The structured surface may be formed from optical elements, such as full cubes (e.g., hexagonal cubes or preferred geometry (PG) cubes), or truncated cubes, or beads as described in, for example, U.S. Pat. No. 7,422,334, which is hereby expressly incorporated by reference in its entirety.

To create non-visible components at different regions of the pathway article, a barrier material may be disposed at such different regions of the adhesive layer. The barrier material forms a physical "barrier" between the structured surface and the adhesive. By forming a barrier that prevents the adhesive from contacting a portion of the structured surface, a low refractive index area is created that provides for retroflection of light off the pathway article back to a viewer. The low refractive index area enables total internal reflection of light such that the light that is incident on a structured surface adjacent to a low refractive index area is retroreflected. In this embodiment, the non-visible components are formed from portions of the barrier material.

In other embodiments, total internal reflection is enabled by the use of seal films which are attached to the structured surface of the pathway article by means of, for example, embossing. Exemplary seal films are disclosed in U.S. Patent Publication No. 2013/0114143, and U.S. Pat. No. 7,611,251, all of which are hereby expressly incorporated herein by reference in their entirety.

In yet other embodiments, a reflective layer is disposed adjacent to the structured surface of the pathway article, e.g. enhanced sign 108, in addition to or in lieu of the seal film. Suitable reflective layers include, for example, a metallic coating that can be applied by known techniques such as vapor depositing or chemically depositing a metal such as aluminum, silver, or nickel. A primer layer may be applied to the backside of the cube-corner elements to promote the adherence of the metallic coating.

The following examples provide other techniques for creating portions of the article message in a pathway article, in which some portions, when captured by an image capture device, may be distinguishable from other content of the pathway article. For instance, a portion of an article message, such as a security element may be created using at least two sets of indicia, wherein the first set is visible in the visible spectrum and substantially invisible or non-interfering when exposed to infrared radiation; and the second set of indicia is invisible in the visible spectrum and visible (or detectable) when exposed to infrared. Patent Publication WO/2015/148426 (Pavelka et al) describes a license plate comprising two sets of information that are visible under different wavelengths. The disclosure of WO/2015/148426 is expressly incorporated herein by reference in its entirety. In yet another example, a security element may be created by changing the optical properties of at least a portion of the underlying substrate. U.S. Pat. No. 7,068,434 (Florczak et al), which is expressly incorporated by reference in its entirety, describes forming a composite image in beaded retroreflective sheet, wherein the composite image appears to be suspended above or below the sheeting (e.g., floating image). U.S. Pat. No. 8,950,877 (Northey et al), which is expressly incorporated by reference in its entirety, describes a prismatic retroreflective sheet including a first portion having a first visual feature and a second portion having a second visual feature different from the first visual feature, wherein the second visual feature forms a security mark. The different visual feature can include at least one of retroreflectance, brightness or whiteness at a given orientation, entrance or observation angle, as well as rotational symmetry. Patent Publication No. 2012/240485 (Orensteen et al), which is expressly incorporated by reference in its entirety, describes creating a security mark in a prismatic retroreflective sheet by irradiating the back side (i.e., the side having prismatic features such as cube corner elements) with a radiation source. U.S. Patent Publication No. 2014/078587 (Orensteen et al), which is expressly incorporated by reference in its entirety, describes a prismatic retroreflective sheet comprising an optically variable mark. The optically variable mark is created during the manufacturing process of the retroreflective sheet, wherein a mold comprising cube corner cavities is provided. The mold is at least partially filled with a radiation curable resin and the radiation curable resin is exposed to a first, patterned irradiation. Each of U.S. Pat. Nos. 7,068,464, 8,950,877, US 2012/240485 and US 2014/078587 are expressly incorporated by reference in its entirety.

FIGS. 5-13 illustrate an optical signature retroreflector and associated techniques for using the retroreflector, in accordance with techniques of this disclosure. In some examples, the retroreflectors and associated techniques of FIGS. 5-13 may be implemented with the articles, systems, and operations described in this disclosure.

In some examples, the optical patterns and/or retroreflective elements of such patterns may be implemented as an optical signature film that retroreflects encoded polarization or wavelength information to a detector capable of detecting it. The retroreflector may often be a phase reversing retroreflector capable of modifying or returning circularly polarized light. The optical detection system (e.g., an image capture device and computing device, as described in this disclosure) may be configured to emit and/or receive polarized light. The optical detection system may include information relating the optical signatures to the classification of vehicles, personal protective equipment, environments, hazards, workers or people, or other information. In some instances, a computing device may determine information from a retroreflector using a 2D or 3D lookup table (or other associative array) that maps retroreflective properties to values, such as shown in FIG. 5.

In some examples, a film may be used to embody the optical pattern and/or retroreflective elements. The film may be configured for downstream optical modification, for example by printing to customize the optical signature. The film can further comprise a spatially variant optical element. The spatially variant optical element may comprise at least one of a retarder and a wavelength selective element. The spatial variance can be below the spatial resolution of the detector system at least one observation position. The spatially variant optical element can take the form of subpixels that form a repeat pattern of a mastersheet. In some examples, in addition to modifying a reflected wavelength or polarization property, subpixels might be empty or might contain scatterers, thereby allowing regions of different retroreflected intensity.

In some examples, the optical signature of the film may be detected by an on board automotive sensor system at some distance away from a location. The encoded information can be used by the onboard computer/software in advance of the vehicle being at the intersection or within a distance for spatial recognition of patterns or shapes. This provides extra calculation time to make ADAS (advanced driver assistance system) or autonomous driving decisions, or to direct solid state Lidar point cloud aiming once the vehicle gets closer to the location.

In some examples, a characteristic of the optical film may be to receive or create circularly polarized light. Circular polarization may be useful in safety contexts because it is more angularly robust compared to the various helicities that can be created with non-circular polarized light. Also, circularly polarized light can be rare in nature, so as a detector system surveys a complicated scene, an object that is returning for example left hand circularly polarized 940 nm light can be more easily recognized by a computing device. Characteristics of circularly polarized light may be preserved for longer distances in foggy environments than linearly polarized light.

In some examples, a system may use a transceiver capable of emitting and detecting polarized light. In some examples, the system may also include a retroreflector capable of modifying the incident light and returning it to the transceiver. In some examples, this system may not require a polarizer to be integrated with a retroreflector. Rather, the polarized light may be generated at the light source, and the retroreflector may modify the light before returning it to the transceiver.

FIG. 5 illustrates an example optical signature language or encoding between retroreflective properties and values. FIG. 5 indicates only one example encoding and many other examples are possible. The left side of the matrix in FIG. 23 represents characteristics of light emitted toward the retroreflector by the transceiver. Two cases represented: (1) an emitter emits one or two wavelengths designated as λ1 or both λ1 and λ2. The top part of the chart designates what the retroreflector will return to the detector. The retroreflector can retroreflects light that was sent to it. If a transceiver only receives λ1 then it only has the option to return λ1. If the transceiver receives both λ1 and λ2, then it has the option to act on and return both. Wavelength can be in the visible or near or mid infrared.

In some examples, an emitter may send out a particular polarization state for a specific emission wavelength. In the example of FIG. 5, there are three categories listed by the emitter λ: L (linearly polarized light, assume this is vertically polarized), LC (left hand circular polarized light), and RC (right hand circularly polarized light).

In FIG. 5, by retroreflector λ, there are six categories representing the polarization state of light returned to the sensor: L (linearly polarized light, assume this is vertically polarized), XL (linear light 90 degrees to the vertical), LC (left hand circular polarized light), RC (right hand circularly polarized light), DP (depolarized light), Abs (the wavelength is absorbed and not returned to the detector). In some examples, an absorber could partially absorb the signal and return a reduced signal. So, if a retroreflected signal has a strength of 1, then the optical signature film could change that strength of the retroreflected signal to be 0, 25%, 50%, 75%, or within a range of 0-25%, 0-50%, or 0-75%.

In some examples, a useful property of this language or encoding is the unique signatures that can be achieved by unique combinations. For example, an emitter may emit λ1 and λ2 linearly polarized and the retroreflector could return λ1 RC and λ2 LC, corresponding to cells 35 and 76. Another scenario is that λ2 is absorbed and doesn't return to the detector thus employing cells 35 and 67. Numerous other combinations are possible. If one were to add a third wavelength λ3 to the matrix, the language or encoding space becomes even larger, and any number of light properties (e.g., wavelength, polarization direction, etc.) may be used to expand the encoding space beyond the size of the example encoding space of this disclosure. Each cell may correspond to a particular value, which may be binary, decimal, hexadecimal, alphanumeric, or any other suitable value.

FIG. 6 illustrates an example of mappings between retroreflective properties and values, in accordance with techniques of this disclosure. FIG. 6 illustrates emitted light (e.g., "Transceiver"), light returned by the retroreflector (e.g., "Retroreflector") which indicates a retroreflective property, and a value associated with the retroreflective property (e.g., "Assigned Meaning"). In some examples, a retroreflective article may include an optical pattern, such as described in this disclosure, which is read and processed by an image capture device and computing device. However, due to limitations on image resolution at far distances, it may not be possible for an image capture device and/or computing device to obtain an image with a resolution that is sufficient to interpret or otherwise decode the optical pattern into information at certain distances. Such distances may be greater than a threshold, where such resolution becomes insufficient in the decoding or interpretation process.

Although decoding or interpretation of such optical codes may not be possible certain distance due to the aforementioned resolution limitations, an image or light capture device may still be capable of receiving retroreflected light. In accordance with techniques of this disclosure, a computing device may determine information from one or more retroreflective properties of light received at a light capture device. Examples of retroreflective properties as described in this disclosure may include light polarization direction or wavelength, although many other examples are described and within the spirit and scope of this disclosure. Because the retroreflective properties of light returned from the retroreflective article may be detected at distances greater than a distance at which an optical pattern may be resolved, techniques and articles of this disclosure may determine a first set of information based on retroreflective properties of light returned from a retroreflective article at a distance between the light capture device and computing device that is greater than a distance at which information for an optical pattern can be interpreted or decoded. Accordingly, at distances further away, retroreflective properties of light returned from a retroreflective article may be used to determine the first set of information, and as the distance between the image or light capture device and the retroreflective article decreases, the optical pattern may be decoded or interpreted to obtain a second set of information. Although an optical pattern has been described, any spatial property of an object that is resolvable may be used to determine the second set of information. Such techniques are further described with respect to the examples of FIG. 6 and FIG. 2.

In the example of FIG. 6, the values correspond to objects near a roadway (e.g., "Person", "Stop Sign", "Autonomous Vehicle"). In some examples, a retroreflector may be embodied on or associated with each type of object. Interpretation component 118 of FIG. 2 may determine a value (e.g., "Person") based on the retroreflected light and perform one or more operations. For example, interpretation component 118 may send the value "Person" to service component 122, which determines based on one or more rules or other service data 233 that an autonomous vehicle, which includes computing device 116, should apply brakes, turn, and/or decelerate. Any suitable operations may be performed in response to determining one or more values from a retroreflective property including those operations described in this disclosure. Although the example of FIG. 6 illustrates examples of objects near a pathway, any rules can be configured for any types of events wherein a computing device performs one or more operations based on the event occurring for a rule. In some examples, a lookup table or other associative data structure, such as illustrated in FIG. 6, for a language or encoding could be implemented in computing device 116 as described in this disclosure or any other computing device described.

In operation, interpretation component 118 may receive, from a light capture device (e.g., one of input components 210), data that indicates at least one retroreflective property of retroreflected light returned from a retroreflective article. The retroreflected light may be captured at a first distance between the light capture device and the retroreflective article. In some examples, interpretation component 118 may determine the retroreflected light has a particular retroreflective property. For example, the particular retroreflective property of retroreflected light may be included in FIG. 6, such as "Returns right circular at kb only". In some examples, image data 232 or service data 233 may include data that represents a set of retroreflective properties. Interpretation component 118 may send data that indicates the particular retroreflective property to service component 122.

Service component 122 may determine first set of information based at least in part on the at least one retroreflective property of the retroreflective article. For example, service data 233 may include a lookup table with key-value pairs, wherein each particular type of retroreflective property is associated with a value that comprises at least part of the first set of information. In the current example, service component 122 may determine a value "Semi-trailer truck" based on the particular retroreflective property "Returns right circular at kb only" that is present in the light returned from the retroreflective article.

In some examples, service component 122 may determine one or more operations to perform based on service data 233. For example, service data 233 may specify one or more rules, configurations, or other operations that change the operation of the pathway-article assisted vehicle. For example, computing device 116 of FIG. 1 may determine the set of information that corresponds the particular retroreflective article and perform any one or more operations described within this disclosure. Examples of such operations may include but are not limited to: changing a level of autonomous driving; changing acceleration, braking, turning, or suspension; and/or generating alerts, notifications, or other outputs of information which may be generated without communicated with a remote computing device or may be generated based on communication with a remote computing device. In some examples, the one or more operations may include sending one or more requests to one or more remote computing devices for data that may be used by computing device 116 to perform other operations.

In some examples, interpretation component 118 may receive from a light capture device or image capture component 102C an image that includes at least one object. Examples of such objects include, but are not limited to: pathway articles, vehicles, persons, buildings, roadway surfaces, or any other objects. In some examples, the object may be the retroreflective article that return the light with the particular retroreflective property.

The image may be captured at a second distance between the light or capture device and a retroreflective article (e.g., that returned the initial light with the particular retroreflective property) that is less than the first distance described above, wherein the object in the image includes a spatially resolvable property that is not resolvable at the first distance. In some examples, a spatially resolvable property may be any visually determinable characteristic of the object. In some examples, the spatially resolvable property of the object is a visual feature of the article. In some examples, the visual feature of the object is a shape or color of the article. In some examples, the spatially resolvable property of the object is an optical pattern embodied on the object. For example, the optical pattern may be an optical pattern as described in this disclosure.

Interpretation component 118 may determine, based at least in part on the spatially resolvable property, a set of information that corresponds to the object in the image. In some examples, interpretation component 118 may perform one or more operations to determine the set of information. For example, in the case of an optical pattern described in this disclosure in FIG. 16, interpretation component 118 may, for each respective visually differentiable element within optical pattern 1604, determine a respective value that corresponds to the respective visually differentiable element. As an example, interpretation component 118 may determine that optical elements 1606A and 1606C are active optical elements that correspond to values of 1. Interpretation component 118 may determine that optical element 1606B is an inactive element that corresponds to a value of 0. Accordingly, interpretation component 118 may determine a bit string that includes the values 1, 0, and 1, that correspond to 1606A, 1006B, and 1606B respectively.

Interpretation component 118 may access image data 232, which may include data that defines a set of spatially resolvable properties. For instance, the spatially resolvable properties may include colors, shapes, or other types of visual indicia, to name only a few examples, interpretation component 118 may determine that one or more spatially resolvable properties are present for the object in the image. Interoperation component 118 may determine that one or more spatially resolvable properties are present for the object in the image by comparing different pixel values of the image to data in image data 232 that defines pixel values for the different spatially resolvable properties. Based on the similarity in pixel values between image data 232 and the captured image, interpretation component 232 may identify the spatially resolvable properties. Other techniques within the skill of one in the art may be used to determine the spatially resolvable properties. Interpretation component 118 may send data to service component 122 that indicates the spatially resolvable properties.

In the example of FIG. 6, service component 122 may determine the set of information based on the spatially resolvable properties. For example, service component 122 may determine that the spatially resolvable properties are the set of information itself. In such examples, service component 122 may display such information or process the information in further operations, such as described in this disclosure. In some examples, service component 122 may use data from interpretation component 118 that corresponds to spatially resolvable properties as lookup or keys that correspond to the set of information, which may be included in service data 233 or in a remote data store. In such examples, service component 122 may perform one or more operations specified in service data 233 based on the spatially resolvable properties. For example, service component 122 may determine, based on the spatially resolvable properties, one or more rules or other service data 233 that an autonomous vehicle, which includes computing device 116, should apply brakes, turn, and/or decelerate. Any suitable operations may be performed in response to determining one or more values from a retroreflective property including those operations described in this disclosure. Although the example of FIG. 6 illustrates examples of objects near a pathway, any rules can be configured for any types of events wherein a computing device performs one or more operations based on the event occurring for a rule. In some examples, a lookup table or other associative data structure, such as illustrated in FIG. 6, for a language or encoding could be implemented in computing device 116 as described in this disclosure or any other computing device described. In some examples, interpretation component 118 and/or service component 122 may determine a value that corresponds to the at least one retroreflective property and perform one or more operations based at least in part on the value while a particular distance between the light capture device and the retroreflective article is greater than the second distance and less than the first distance, as the first and second distances are described in the foregoing example.

In some examples, computing device 116 is included in a pathway-article assisted vehicle to control the operation of the pathway-article assisted vehicle. In some examples, performing at least one operation based at least in part on a set of information comprises changing an operation of a pathway-article assisted vehicle. In some examples, a retroreflective property is at least one of a wavelength, polarization state, or phase retardation of the retroreflected light, or any other retroreflective property described in this disclosure or within the knowledge of one of ordinary skill in the art. In some examples, the first set of information is interpretable based on a combination of a first spectral response and a second spectral response. In some examples, one or more filters may be embodied on a retroreflective article and/or a light capture device (e.g., on a sensor or lens of the light capture device). Examples of such filters may include notch filters, low-pass filters, high-pass filters, or any other suitable filters. In some examples, a retroreflective property of the retroreflective light may be based at least in part on one or more filters. That is, incident light at the retroreflective article and/or image capture device may have a retroreflective property that is modified by one or more filters resulting in a filtered or modified retroreflective property, which may be determined and/or further processed in accordance with techniques of this disclosure.

Figure 7:
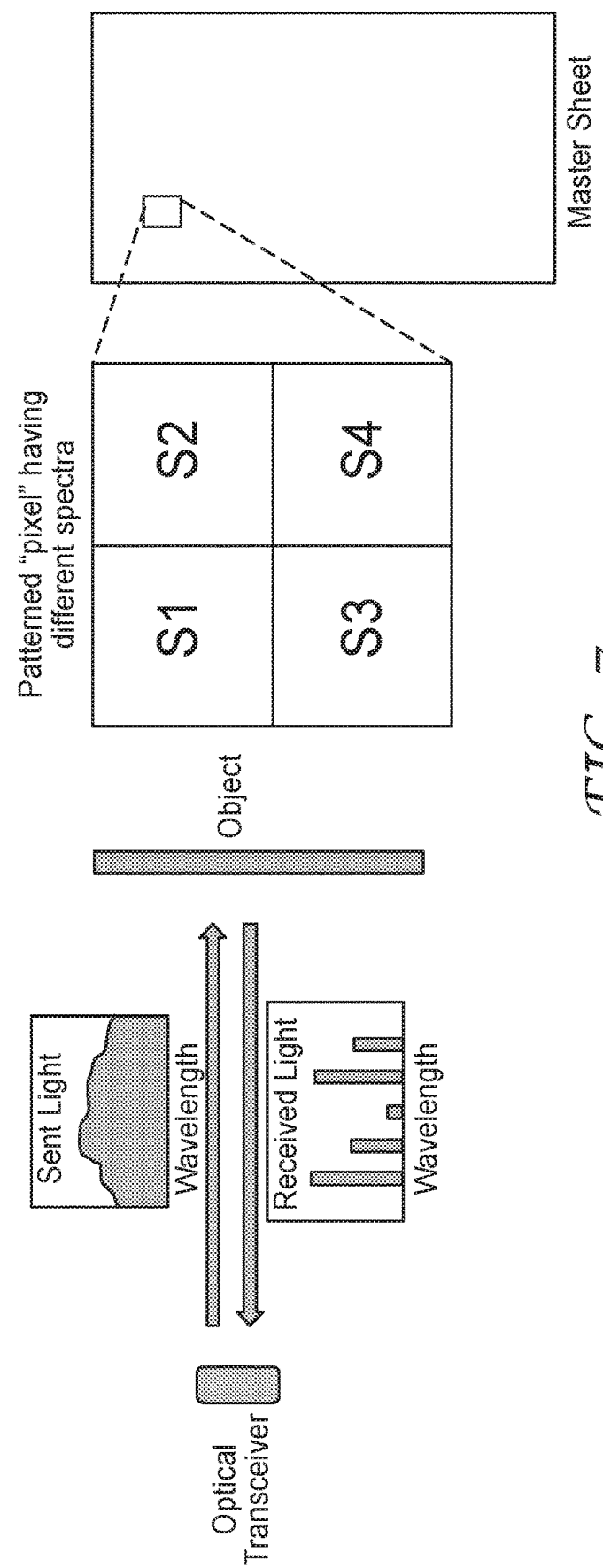
FIG. 7 illustrates a mastersheet approach for creating optical signatures, in accordance with techniques of this disclosure.

FIG. 7 illustrates a mastersheet approach for creating optical signatures, in accordance with techniques of this disclosure. A mastersheet comprising an array of repeat cells can be tuned to provide various encoded optical signatures to a detector that can detect the signal and compare to a library of assigned meanings. The tuning of the mastersheet can be accomplished altering the subpixels by printing or other suitable methods. For example, in the case of the subpixels varying by wavelength, Pixel 1, 2, 3, 4 returns $\lambda 1$, $\lambda 2$, $\lambda 3$, $\lambda 4$ respectively. The signal detected by a detector summing the output of the film will be 4 wavelengths. If, however, the 3rd subpixel is printed with an absorbing dye that absorbs $\lambda 3$, then the summed signal detected by the detector will be $\lambda 1$, $\lambda 2$, $\lambda 3$, and thus a different optical signature (referred to also as retroreflective property). In some examples, if the $3^{rd}$ subpixel had no printing, it may provide a "white" subpixel, resulting in, for example, a lighter hue or a different polarization, when viewed from a distance that is lower than the resolution of the image. This may represent another approach to achieving gradations in intensity.

Next consider the case where the subpixels, rather than differing by wavelength, differ by retardation. When the subpixels receive, for example, vertically oriented linearly polarized light, P1 returns vertical linear light, P2 returns horizontal linear light, P3 returns left hand circularly polarized light, and P4 returns right hand circularly polarized light. In this example a visible blocking dye may be printed on P1, P2, P3 but not P4. In such example, the sheet returns right hand circularly polarized light. In other examples, a high pass absorber is printed over P3 that transmits green, and a different high pass absorber that transmits red is printed over the P4 subpixel. P1 and P2 may be blocked with a broad band dye. This example accordingly includes a film that returns green left hand circular light, and returns red light that is right hand circular.

In some examples, subpixels differ in the observation angle of retroreflection, that is they have different angular properties for different spatial regions. In some examples, the angular output of light and/or the angular output of different wavelengths of light could be selectively tuned to provide localization function for a retroreflector.

Figure 8:
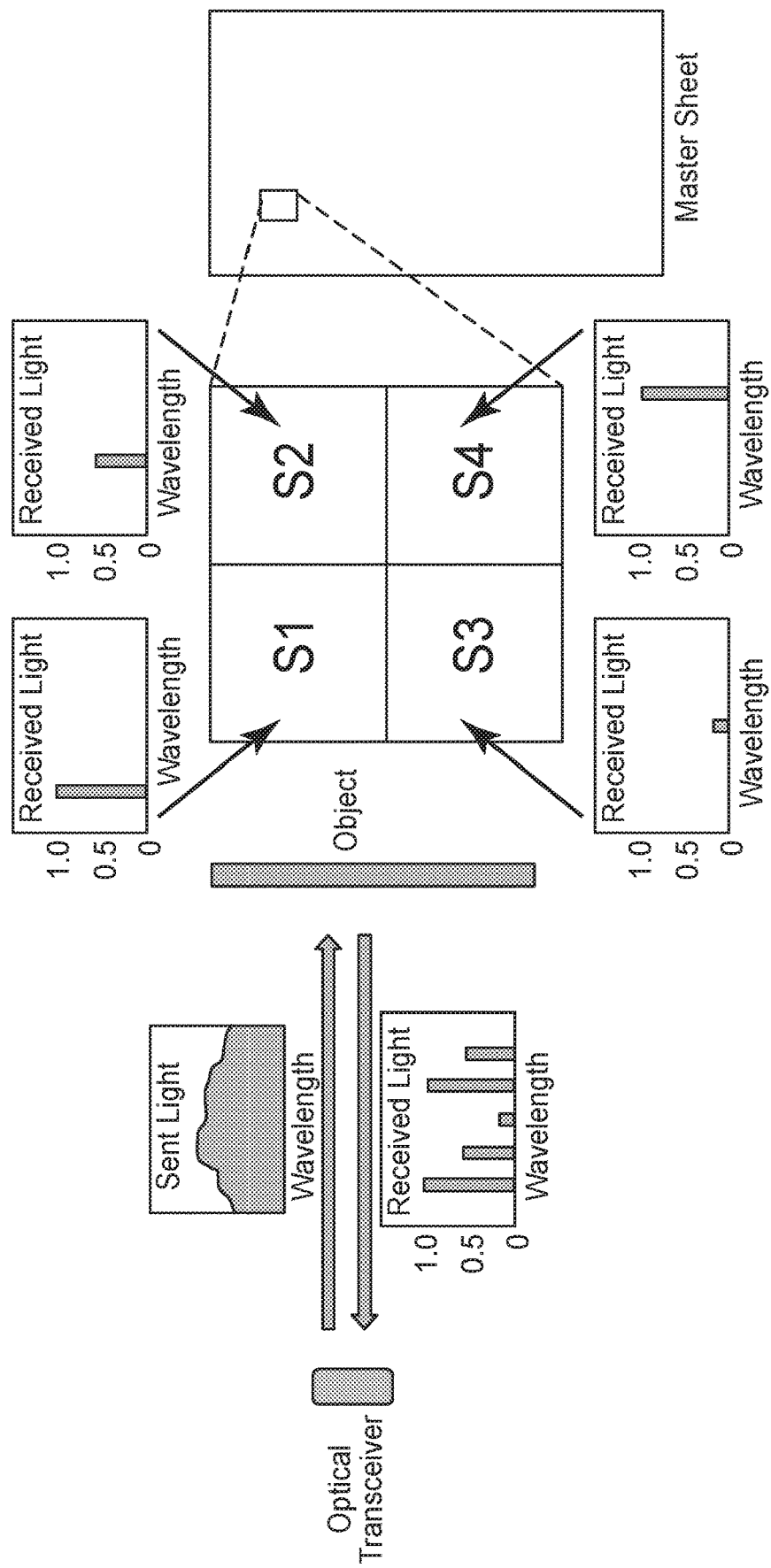
FIG. 8 illustrates an example of wavelength patterning of light, in accordance with techniques of this disclosure.

FIG. 8 illustrates an example of wavelength patterning of light, in accordance with techniques of this disclosure. In FIG. 8, each pixel or sub-pixel is configured to retroreflect a different wavelength of light based on emitted light. For example, each sub-pixel S1, S2, S3, S4 retroreflects a different wavelength of light based on the emitted (or sent) light from the optical transceiver. In some examples, the optical transceiver may receive light that represents an aggregation of the different wavelengths. The aggregation may represent one or more encoded values.

Figure 9:
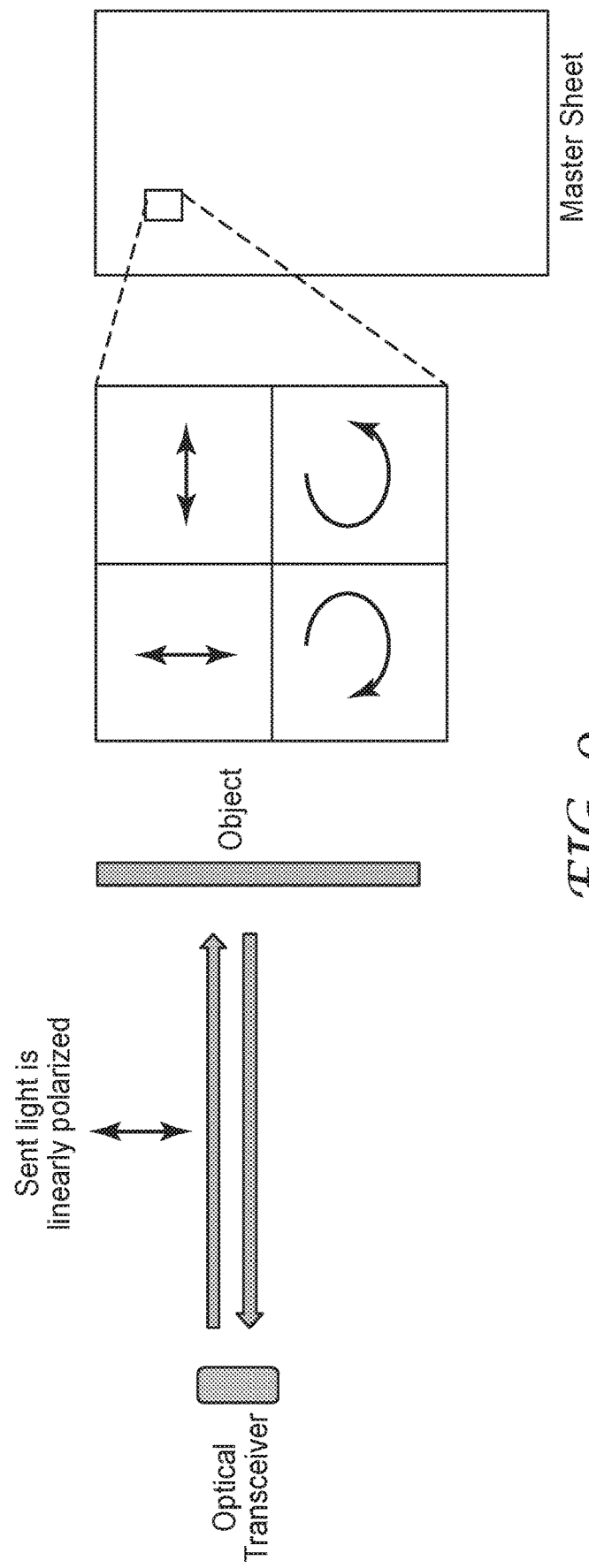
FIGS. 9-12 illustrate examples of polarization patterning of light, in accordance with techniques of this disclosure.
Figure 10:
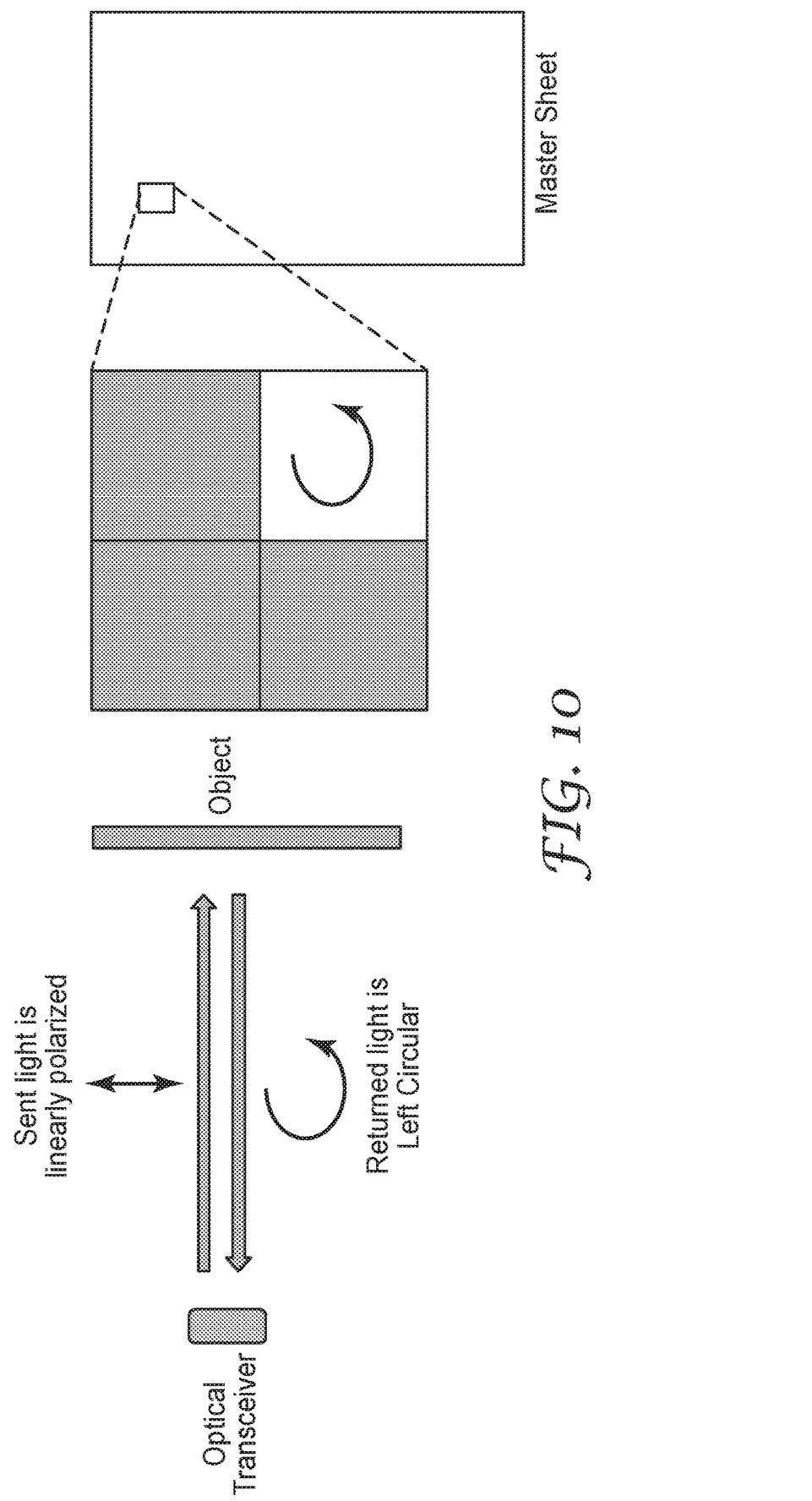
Figure 11:
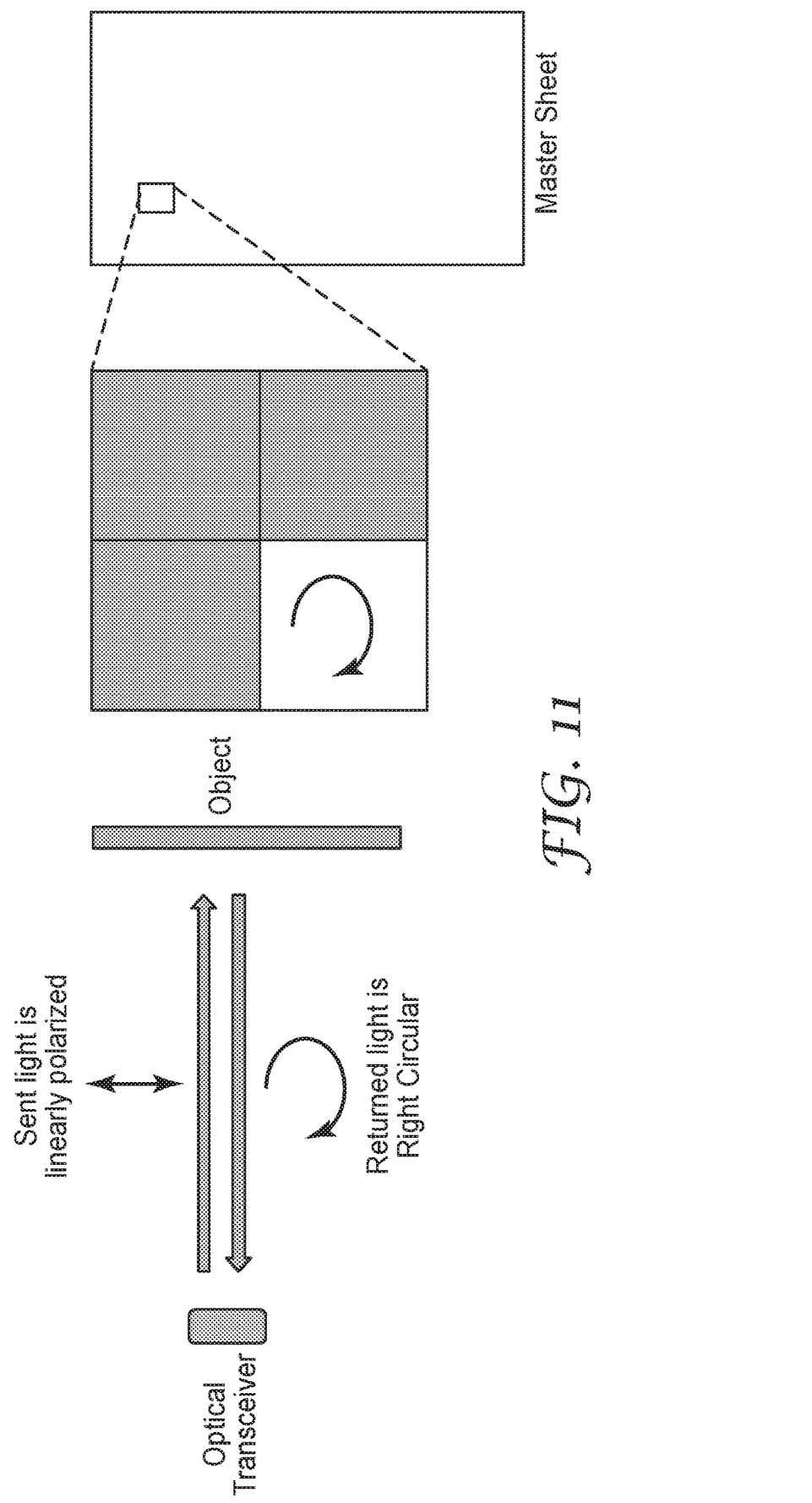

FIG. 9 illustrates an example of polarization patterning of light, in accordance with techniques of this disclosure. In FIG. 9, each pixel or sub-pixel is configured to retroreflect a different polarization state based on emitted light. For example, each sub-pixel from the master sheet retroreflects a different polarization state of light based on the emitted (or sent) light from the optical transceiver. In some examples, the optical transceiver may receive light that represents an aggregation of different polarization states. The aggregation may represent one or more encoded values.

Figure 12:
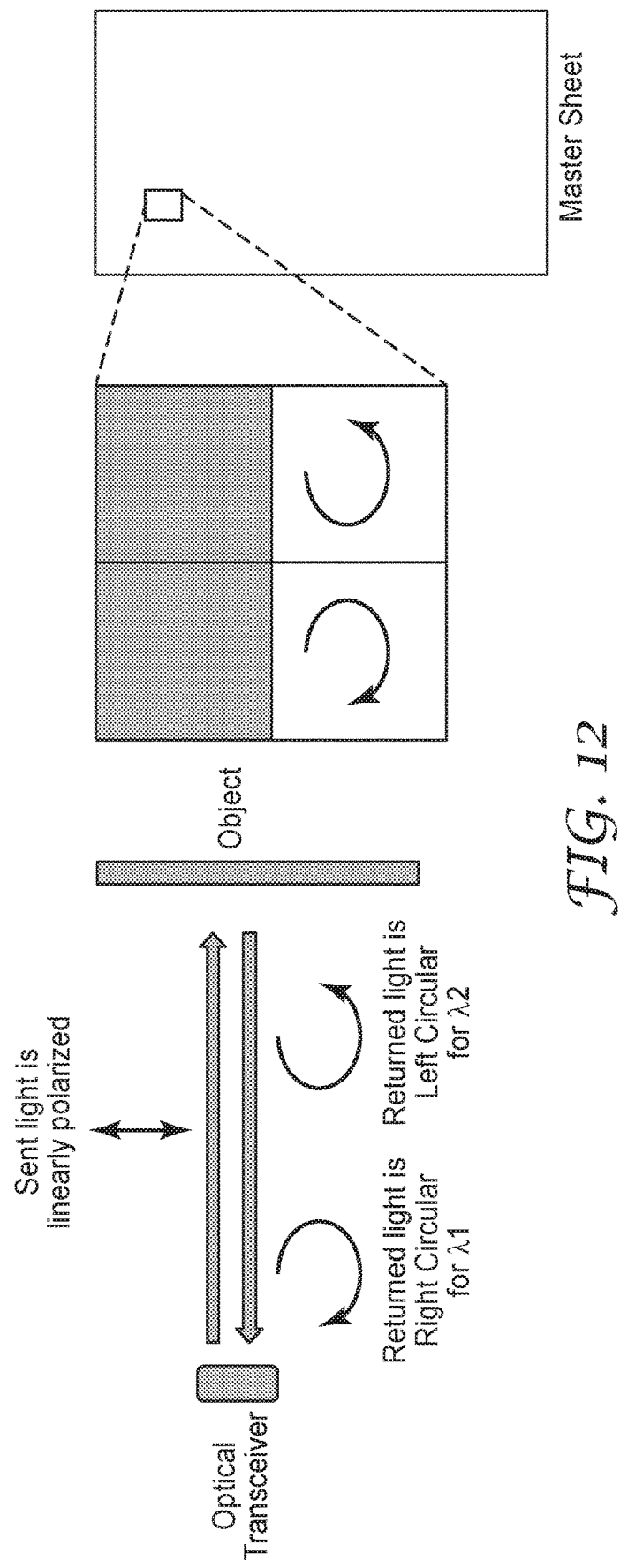

FIGS. 9-12 illustrate examples of polarization patterning of light, in accordance with techniques of this disclosure. In FIGS. 12, each pixel or sub-pixel is configured to retroreflect a different polarization states, where each state may include multiple properties. For example, a polarization state may indicate a color (e.g., red) and a direction of light (e.g., right circular).

Figure 13:
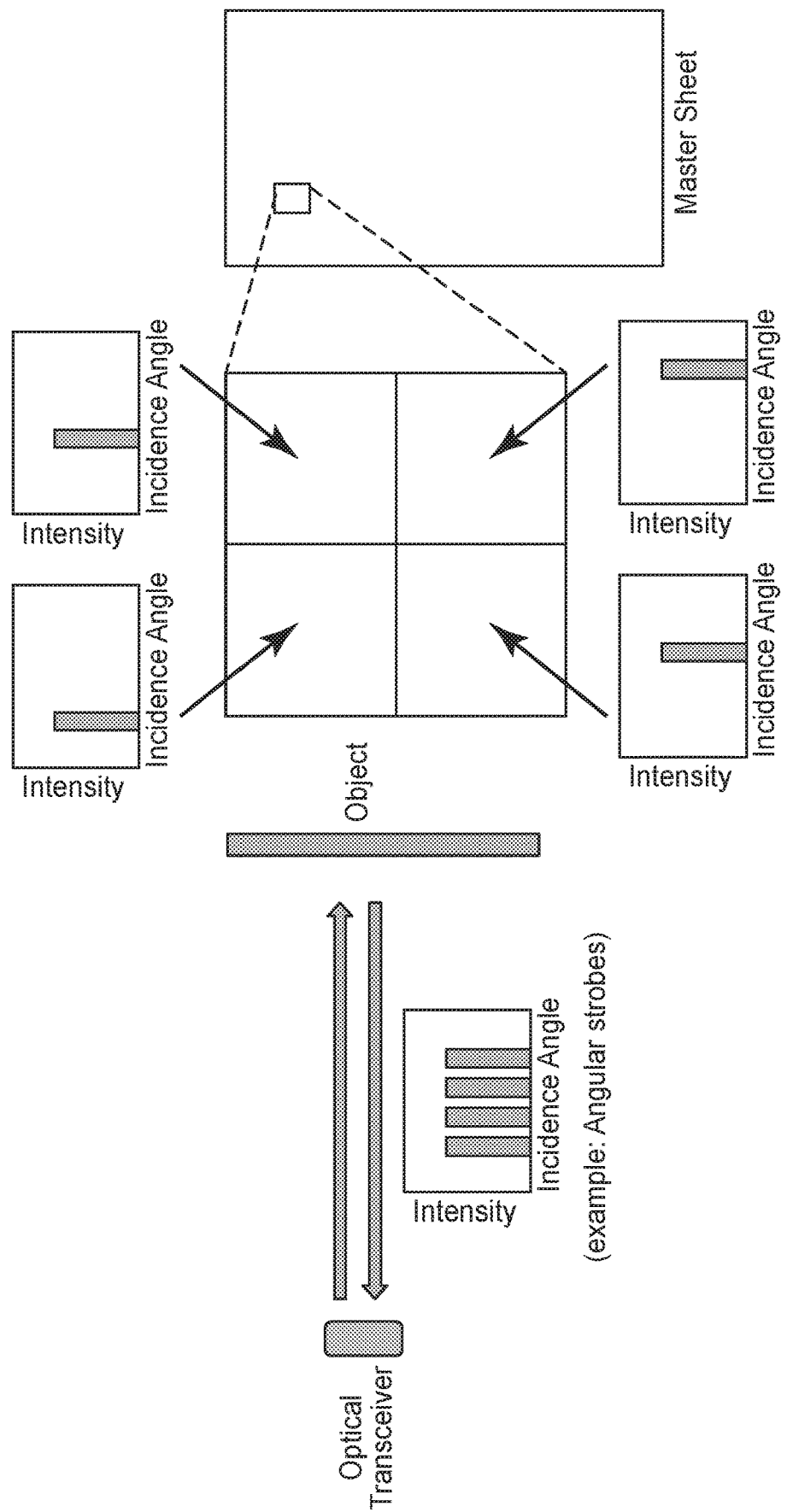
FIG. 13 illustrates an example of patterning based on angular characteristics of light, in accordance with techniques of this disclosure.

FIG. 13 illustrates an example of patterning based on angular characteristics of light, in accordance with techniques of this disclosure. In FIG. 13, each pixel or sub-pixel is configured to retroreflect a different light intensity based on an incidence angle. As such, in some examples, the retroreflector may only retroreflect light at certain incidence angles. In some examples, the retroreflect may retroreflect different light at different incidence angles. As such, different encoded values may be detected by the optical transceiver at different angles.

The examples of FIG. 9-13 illustrate different retroreflective properties that are possible in a system and which may be mapped to values. In such examples, the values may be used to perform one or more operations as described in various examples of this disclosure.

Additional example implementations of a retroreflective article for embodying an optical pattern are described in U.S. patent application Ser. No. 14/388,082, filed Mar. 29, 2013, which is incorporated by reference herein in its entirety. Additional description is found in U.S. Provisional Appl. Nos. 62/400,865, filed Sep. 28, 2016; 62/485,449, filed Apr. 14, 2017; 62/400,874, filed Sep. 28, 2016; 62/485,426, filed Apr. 14, 2017; 62/400,879, filed Sep. 28, 2016; 62/485,471, filed Apr. 14, 2017; and 62/461,177, filed Feb. 20, 2017; each of which is incorporated herein by reference in its entirety.

FIG. 14 illustrates a hyperspectral optical pattern that includes multiple optical sub-patterns that are visible in different light spectra, in accordance with techniques of this disclosure. Articles and techniques of this disclosure are illustrated in FIG. 14 with respect to a retroreflective article, such as retroreflective article 1400, which may be a STOP sign. Retroreflective article 1400 may include an optical pattern not detectable in the human visible spectrum. For instance, retroreflective article 1400 is shown as it would appear in the visible light spectrum. Retroreflective article 1400 may include an optical pattern 1406. Unlike conventional optical patterns on retroreflective articles, optical pattern 1406 may be comprised of multiple, optical sub-patterns that are visible in different light spectra. For example, retroreflective article 1400 may include a first optical sub-pattern 1402 that is visible in a first light spectrum. Retroreflective article 1400 may include a second optical sub-pattern 1404 that is visible in a second light spectrum. In some examples, the first and second light spectra are different. In some examples the first and second light spectra do not overlap. In other examples, the first and second light spectra partially overlap. As shown in FIG. 14, a combination of the first optical sub-pattern 1402 and the second optical sub-pattern 1404 form or represent optical pattern 1406 as shown with the retroreflective article 1400.

In the example of FIG. 14, optical pattern 1406 may represent a set of information that is interpretable based on a combination of first optical sub-pattern 1402 that is visible in the first light spectrum and second optical sub-pattern 1404 that is visible in a second light spectrum. For example, optical pattern 1406 may include the optical pattern includes a set of visually differentiable elements, such as optical elements 1408A and 1408B. Each optical element may correspond to a region of optical pattern 1406. In some examples, a set of regions may be arranged as a grid to form optical pattern 1406. Each optical element may correspond to a value based at least in part the visual appearance of the respective element. For example, a set of information may be coded into a bitstring. Each bit position in the bitstring may correspond to an optical element in optical pattern 1406. If the bitstring is coded in base 2 numbering system, an optical element may be assigned a value of 0 or 1.

Each of the set of visually differentiable elements 1408A and 1408B may be at least one of an active element or an inactive element. For example, an active element may be assigned a value of 1 and may appear black, while an inactive element may be assigned a value of 9 and may appear which. In other examples, the values associated with active and inactive values may be inverted. In some examples the appearance (e.g., black or white) of active and inactive values may be inverted. In some examples, a first value corresponds to active elements, and a second value corresponds to inactive elements, and the first value is different than the second value. In the case of coding information into a bitstring, each bit value in the bitstring may be embodied in a respective optical element, such that the entire bitstring is encoded as a set of active and/or inactive optical elements within optical pattern 1406.

The set of information coded in optical pattern 1406 may be any suitable information. Examples of such information include, but are not limited to: type of infrastructure article, lookup value (e.g., uniform resource identifier), a location of the infrastructure article or information relating to the pathway. In other examples, the optical pattern may be position on clothing. The set of information may indicate the presence of clothing or a person, or may indicate a role for a person, to name only a few examples. In some examples, the optical pattern may be positioned on a vehicle and indicate a type of vehicle, whether the vehicle is autonomous or driving at a particular autonomous level, or any other information that is associated with the vehicle. The optical pattern may be associated with any article, and the foregoing examples, provide exemplary, non-limiting examples of such information that may be coded in an optical pattern embodied on an article.

Figure 15:
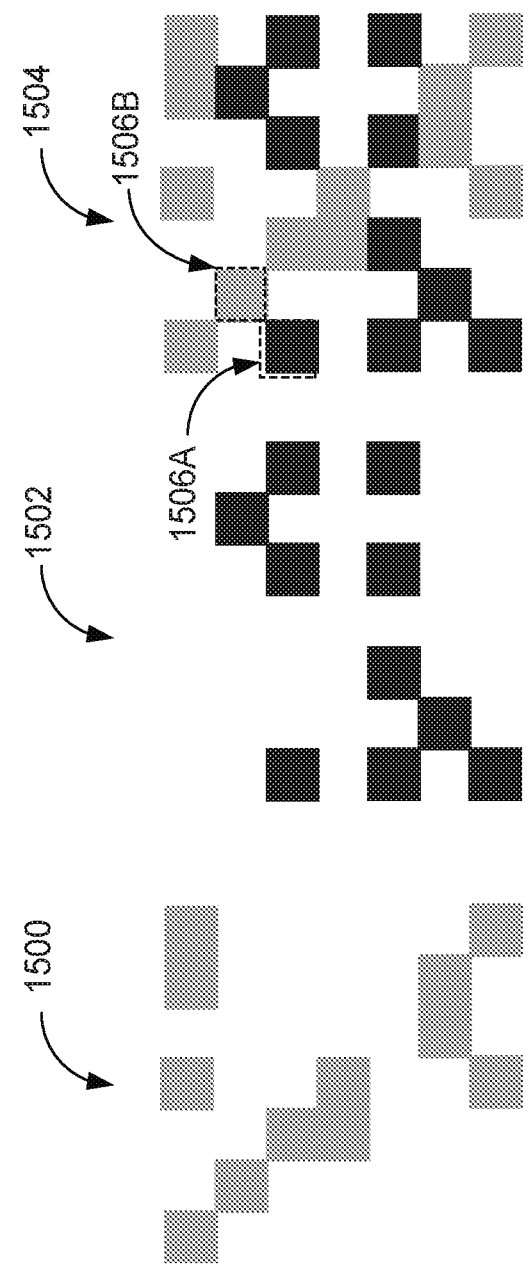
FIG. 15 illustrates a hyperspectral optical pattern that includes multiple optical sub-patterns that are visible in different light spectra, in accordance with techniques of this disclosure.

FIG. 15 illustrates a hyperspectral optical pattern that includes multiple optical sub-patterns that are visible in different light spectra, in accordance with techniques of this disclosure. As shown in FIG. 15, a first optical sub-pattern 1500, a second optical sub-pattern 1502, and a combination of the first and second optical sub-patterns are illustrated, wherein the optical elements of the first and second optical sub-patterns mate within the optical pattern 1504. In some examples, first optical sub-pattern 1500 is visible in a first light spectrum and comprises a first portion of optical pattern 1504. In some examples, none of the set of information represented by optical pattern 1504 is interpretable without the first portion of the optical pattern 1504 that is represented by first optical sub-pattern 1500. That is, in some examples, the information represented by optical pattern 1504 cannot be determined if first optical sub-pattern 1500 is not visible or determinable as part of optical pattern 1504.

In some examples, the set of information is interpretable from optical pattern 1504 is based on a spatial relationship between first optical sub-pattern 1500 and second optical sub-pattern 1502 within optical pattern 1504. In some examples, interpretation by a computing device of the set of information within optical pattern 1504 is dependent on a first position of the first optical sub-pattern 1500 in relation to a second position of the second optical sub-pattern 1502. For example, optical element 1506A and 1506B may be positioned during the coding in optical pattern 1504 to create a specific set of information. In other words, the positioning and/or spatial relationship between optical elements 1506A and 1506B may provide or otherwise result in particular information.

In some examples, second optical sub-pattern 1502 that is visible in the second light spectrum comprises a second portion of optical pattern 1504. In some examples, none of the set of information represented by the optical pattern 1504 is interpretable without the second portion of the optical pattern represented by the second optical sub-pattern 1502. In some examples, the set of information represented by optical pattern 1504 is a first set of information. First optical sub-pattern 1500 that is visible in a first light spectrum may not represent a second, independent set of information when interpreted independently of second optical sub-pattern 1502. That is second optical sub-pattern 1502 alone, may not represent any meaningful to data to a computing device or human when interpreted without first optical sub-pattern 1500. Accordingly, in some examples, first and second optical sub-patterns 1500 and 1502 may only provide for an set of information when interpreted collectively in optical pattern 1504.

In some examples, a first light spectrum and a second light spectrum that correspond to sub-patterns 1500 and 1502 may do not substantially overlap. In some examples, not substantially overlapping may mean that less than 1%, 5%, 10% or 20% of the spectra overlap. In some examples, at least one of the first light spectrum or the second light spectrum that correspond to sub-patterns 1500 and 1502 is within the infrared light spectrum.

In some examples, the set of information represented by the optical pattern is usable by a pathway-article assisted vehicle to change the operation of the pathway-article assisted vehicle. For example, computing device 116 of FIG. 1 may determine the set of information represented by the optical pattern 1504 and perform any one or more operations described within this disclosure. Examples of such operations may include but are not limited to: changing a level of autonomous driving; changing acceleration, braking, turning, or suspension; and/or generating alerts, notifications, or other outputs of information which may be generated without communicated with a remote computing device or may be generated based on communication with a remote computing device.

FIG. 16 illustrates a hyperspectral optical pattern that may be processed by a computing device, in accordance with techniques of this disclosure. As shown in FIG. 16 an optical pattern 1604 may include a first optical sub-pattern 1600 and a second optical sub-pattern 1602. In the example of FIG. 16, a first optical sub-pattern 1600, a second optical sub-pattern 1602, and a combination of the first and second optical sub-patterns as optical patter 1604 is illustrated, wherein the first and second optical sub-patterns at least partially overlap within the optical pattern. In some examples, optical elements of each sub-pattern may overlap such that the optical sub-patterns are interleaved but particular optical elements of each optical sub-pattern do not obstruct or overlap with one another.

In the example of FIG. 16, a computing device, such as computing device 116 may determine a set of information based on the optical code that is represented by the first optical sub-pattern and the second optical sub-pattern. Reference is made to components of computing device 116 for example purposes in FIG. 16, although other suitable computing devices and/or components of such computing devices may be used.

In some examples, interpretation component 118 may receive from a light capture device (e.g., image capture component 102C), a first image of a retroreflective article comprising first optical sub-pattern that is visible in a first light spectrum, wherein the first optical sub-pattern 1600 is included in optical pattern 1604 embodied on the retroreflective substrate. In some examples, the first image may be captured by emitting a light source in a first light spectrum. Interpretation component 118 may receive from a light capture device (e.g., image capture component 102C), a second image of the retroreflective article comprising second optical sub-pattern that is visible in a second light spectrum, wherein the second optical sub-pattern 1604 is included in optical pattern 1604 embodied on the retroreflective substrate. In some examples, the second image may be captured by emitting a light source in a first light spectrum. Interpretation component 118 may store one or more of the images in image data 232 for further processing in subsequent operations.

Interpretation component 118 may interpret the first optical sub-pattern 1600 in combination with the second-optical sub-pattern 1602 to determine a set of information represented by the optical pattern 1604 that comprises the first optical sub-pattern 1600 and the second optical sub-pattern 1602. In some examples, interpretation component 118 may perform one or more operations to determine the set of information. For example, interpretation component 118 may, for each respective visually differentiable element within optical pattern 1604, determine a respective value that corresponds to the respective visually differentiable element. As an example, interpretation component 118 may determine that optical elements 1606A and 1606C are active optical elements that correspond to values of 1. Interpretation component 118 may determine that optical element 1606B is an inactive element that corresponds to a value of 0. Accordingly, interpretation component 118 may determine a bit string that includes the values 1, 0, and 1, that correspond to 1606A, 1006B, and 1606B respectively. If interpretation component 118 reads the optical elements in a raster scan order from lower ordered columns to higher ordered columns (left-to-right) and vertically (top-to-bottom), then interpretation component 118 may generate a bitstring that includes 010 based on reading the highest ordered column, top-to-bottom in the order of 1606A, 1606B, and 1606C. In this way, interpretation component 118 may determine the set of information for optical pattern 1604 based on each respective value that corresponds to each respective visually differentiable element (also referred to as optical element). Other raster scan orders with the ordinary skill in the art may be used.

In some examples, image data 232 may include configuration data that indicates mappings of values to optical element appearances. Although certain examples, describe active and inactive optical elements (e.g., having a binary value), in order examples, an optical element may encode a base-N value, wherein the optical element may have one of N different visual appearances. Example appearances may include a gradient range with values correspond to each value within the range, a pattern set wherein each value correspond to a different pattern, or any other suitable visual characteristic that may distinguish one or more optical elements with different corresponding values.

In some examples, interpretation component 118 may interpret the set of information from optical pattern 1604 based on a spatial relationship between first optical sub-pattern 1600 and second optical sub-pattern 1602 within optical pattern 1604. In some examples, interpretation by interpretation component 118 of the set of information within optical pattern 1604 is dependent on a first position of the first optical sub-pattern 1600 in relation to a second position of the second optical sub-pattern 1602. In some examples, a combination of the first and second optical sub-patterns is generated by interpretation component 118 summing the first optical sub-pattern that is visible in a first light spectrum and the second optical sub-pattern that is visible in a second light spectrum. In some examples, a combination of the first and second optical sub-patterns is generated by interpretation component 118 subtracting the first optical sub-pattern that is visible in a first light spectrum and the second optical sub-pattern that is visible in a second light spectrum.

In some examples, a spatial relationship is defined by a first bounds and a second bounds at least partially overlapping within the optical pattern. For instance, the first optical sub-pattern 1600 that is visible in the first light spectrum defines the first bounds at the perimeter of the outermost optical elements of the first optical sub-pattern, and the second optical sub-pattern 1602 that is visible in the second light spectrum defines the second bounds at the perimeter of the outermost optical elements of the second optical sub-pattern. In some examples, a spatial relationship is defined by a first bounds of the first optical sub-pattern 1600 and a second bounds of the second optical pattern 1602 that interleaves within the optical pattern 1604. The first optical sub-pattern 1600 may be visible in the first light spectrum and defined by first bounds at the perimeter of the outermost optical elements of the first optical sub-pattern 1600. The second optical sub-pattern 1600 may be visible in the second light spectrum and defined by second bounds at the perimeter of the outermost optical elements of the second optical sub-pattern 1602.

In some example, such as shown and described in FIGS. 1 and 2, computing device 116 is included in a pathway-article assisted vehicle to control the operation of the pathway-article assisted vehicle. In some examples, computing device 116 may perform operations, such as with vehicle control component 114, based at least in part on the set of information from optical pattern 1604 comprises changing an operation of a pathway-article assisted vehicle.

As shown in FIG. 2, computing device 116 may include security component 120 and/or service component 122. In some examples, security component 120 may be configured to perform security operations with respect to optical code 1604. For example, security component 120 may select security data 234, which indicates particular light spectra that will be emitted by a light source. The particular light spectra may be configured by a human or machine. In some examples, the particular light spectra may be part of a security scheme that is unknown to a set of third-parties, such that security component 120 can emit and capture light in particular light spectra to obtain optical sub-patterns that form an optical pattern, but other such third-parties are unaware of which particular light spectra to emit or capture. Accordingly, the set of information represented by the optical pattern 1604 may only be interpretable to computing devices include security data indicating the particular light spectra required to capture images of the optical sub-patterns. Security component 120 may select security data 234, which indicates particular light spectra that will be captured by an image or light capture device. Based on whether security component 120 determines that a valid set of information has been interpreted or otherwise decoded by interpretation component 118, security component 120 may send data to service component 122 to perform one or more operations. For instance, security component 120 may determine that an optical sub-pattern or optical pattern 1604 is not valid, in which case service component 122 may perform one or more operations. In other examples, security component 120 may determine that an optical sub-pattern or optical pattern 1604 is valid, in which case service component 122 may perform one or more different operations based on the validity of the optical code 1604.

In some examples, computing device 116 may include service component 116. Service component 116 may perform one or more operations based on the set of information included in optical code 1604. For instance, operations performed by service component 122 may include but are not limited to, automating lighting, providing adaptive cruise control, automating braking, incorporating GPS/traffic warnings, connecting to smartphones, alerting driver to other cars or dangers, keeping the driver in the correct lane, showing what is in vehicle blind spots. Other examples, may include, but are not limited to changing a level of autonomous driving; changing acceleration, turning, or suspension; and/or generating alerts, notifications, or other outputs of information which may be generated without communicated with a remote computing device or may be generated based on communication with a remote computing device.

In some examples, a computing device may receive, from a light capture device, retroreflected light that indicates at least one retroreflective property of a retroreflective article, wherein retroreflective light is captured at a first distance between the light capture device and the retroreflective article wherein the retroreflective article is not spatially resolvable at the first distance. The retroreflective article may include an optical pattern comprised of optical sub-patterns where the retroreflective properties of the sub-patterns are different and where the combination of the retroreflective properties are associated with a set of information. The retroreflective properties may include a combination of wavelengths, ranges of wavelengths, polarizations, and relative retroreflective light intensities. The set of information may include the retroreflective article type.

In some examples, a system with a light emitter and light capture device, emits a broadband light source that is received by a retroreflective article from a first distance from the light capture device where the retroreflective article is not spatially resolvable. The retroreflective article may include a wavelength absorber that absorbs much of the light in UV spectrum except in at least one wavelength range in the UV spectrum and a wavelength absorber that absorbs much of the light in IR spectrum except in at least one wavelength range in the IR spectrum. The light capture device may receive retroreflective light from the retroreflective article where the retroreflective light includes a narrow range of UV wavelengths, a range of human visible wavelengths, and a narrow range of IR wavelengths. The wavelength profile across the UV, visible, and IR spectra associate with a type of object, including: traffic signs, infrastructure furniture, vehicles, and people.

Figure 17:
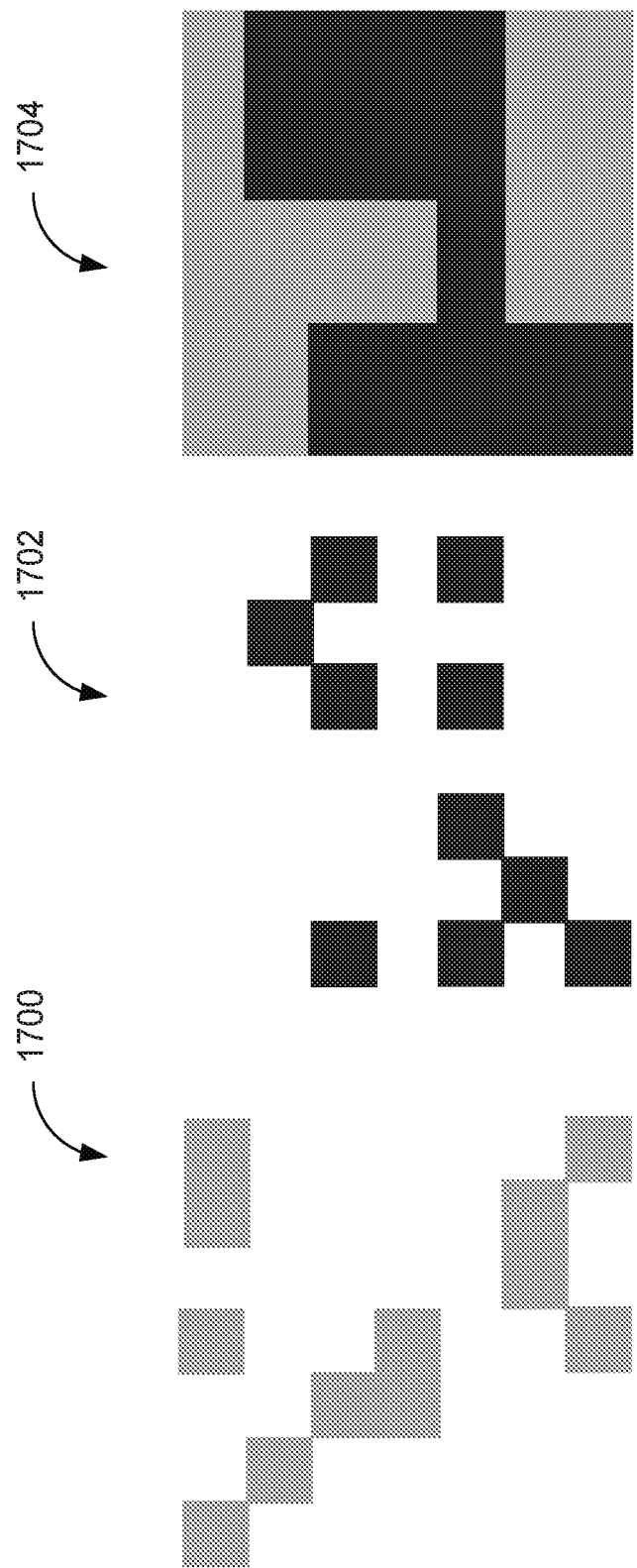
FIG. 17 illustrates an optical pattern in accordance with techniques of this disclosure.

FIG. 17 illustrates an optical pattern in accordance with techniques of this disclosure. For instance, optical pattern 1704 includes a first optical sub-pattern 1700, and a second optical sub-pattern 1702. A set of information represented by optical pattern 1704 may be based on a spatial relationship defined by the first optical sub-pattern and the second optical sub-pattern. In the example of FIG. 17, interpretation component 118 may combine optical sub-patterns 1700 and 1702. Interpretation component 118 may determine a set of inactive optical elements that exist in the combined optical sub-patterns. Interpretation component 118 may assign an active element for each inactive element to the first or second optical sub-pattern, such that optical pattern 1704 includes a active set of optical elements for the first optical sub-pattern and an active set of optical elements for the second optical sub-pattern. In this way multiple different regions that correspond to the first or second optical sub-patterns may be formed in the optical pattern. Based on the shape, number of regions, or spatial relationship, to name only a few possible visual differentiators, between the regions, interpretation component 118 may determine a set of information, which may be used to perform operations as described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples of the disclosure have been described. These and other examples are within the scope of the following claims.

The invention claimed is:

1. A method comprising:
receiving, from a light capture device, retroreflected light that indicates at least one retroreflective property of a retroreflective article, wherein retroreflected light is captured at a first distance between the light capture device and the retroreflective article, wherein the retroreflective property comprises a phase retardation of the retroreflected light;
determining, by a computing device communicatively coupled to the light capture device, a first set of information based at least in part on the at least one retroreflective property of the retroreflective article, wherein the first set of information is determined from a pattern encoded in the phase retardation of the retroreflected light;
receiving, by the computing device and from the light capture device, an image that includes at least one object, wherein the image is captured at a second distance between the light capture device and the retroreflective article that is less than the first distance, wherein the at least one object in the image includes a spatially resolvable property that is not resolvable at the first distance;

determining, by the computing device and based at least in part on the spatially resolvable property, a second set of information that corresponds to the object in the image; and performing, by the computing device, at least one operation based at least in part on the second set of information.

2. The method of claim 1, wherein the object is the retroreflective article.

3. The method of claim 1, wherein the at least one operation is a first operation, wherein determining the first set of information based at least in part on the at least one retroreflective property of the retroreflective article comprises:

determining a value that corresponds to the at least one retroreflective property; and performing a second operation based at least in part on the value while a particular distance between the light capture device and the retroreflective article is greater than the second distance and less than the first distance.

4. The method of claim 1, wherein the spatially resolvable property of the object is a visual feature of the article.

5. The method of claim 1, wherein the visual feature of the object is at least one of a shape and a color of the article.

6. The method of claim 1, wherein the spatially resolvable property of the object is an optical pattern embodied on the object.

7. The method of claim 1, wherein the computing device is included in a vehicle to control the operation of the vehicle.

8. The method of claim 1, wherein performing at least one operation based at least in part on the second set of information comprises changing an operation of a vehicle.

9. The method of claim 1, wherein the retroreflective property further comprises at least one of a wavelength and a light intensity of the retroreflected light.

10. The method of claim 1, wherein the first set of information is interpretable based on a combination of a first spectral response and a second spectral response.

11. The method of claim 1, wherein the retroreflective article comprises:

a retroreflective substrate; and an optical pattern embodied on the retroreflective substrate, the optical pattern comprising a first optical sub-pattern and a second optical sub-pattern, wherein the optical pattern represents a set of information that is interpretable based on a combination of the first optical sub-pattern that is visible in a first light spectrum and the second optical sub-pattern that is visible in a second light spectrum, wherein the first and second light spectra are different.

12. The method of claim 1, wherein the first spectral response is within a first light spectrum and the second spectral response is within a second light spectrum.

13. The method of claim 1, wherein the retroreflective property is based at least in part on a filter embodied on the retroreflective article.

14. The method of claim 1, wherein the retroreflective property is based at least in part on a filter embodied on the light capture device.

15. A computing device comprising one or more computer processors; and a memory comprising instructions that, when executed by the one or more computer processors, cause the one or more computer processors to perform the method of claim 1.

16. A non-transitory, computer-readable medium comprising instructions that, when executed in a computer processor, causes the computer processor to perform the method of claim 1.

17. An apparatus comprising means for performing the method of claim 1.

* * * * *